United States Patent
Adcock et al.

(10) Patent No.: US 12,073,467 B2
(45) Date of Patent: *Aug. 27, 2024

(54) TRACKING LIQUIDITY ORDER

(71) Applicant: NYSE Group, Inc., New York, NY (US)

(72) Inventors: Paul D. Adcock, Burr Ridge, IL (US); Michael A. Cormack, Evanson, IL (US); Thomas F. Haller, Longwood, FL (US); Robert A. Hill, LaGrange, IL (US)

(73) Assignee: NYSE Group, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/427,153

(22) Filed: Jan. 30, 2024

(65) Prior Publication Data

US 2024/0169432 A1 May 23, 2024

Related U.S. Application Data

(63) Continuation of application No. 18/347,212, filed on Jul. 5, 2023, now Pat. No. 11,922,503, which is a continuation of application No. 18/106,156, filed on Feb. 6, 2023, now Pat. No. 11,748,812, which is a continuation of application No. 17/891,669, filed on Aug. 19, 2022, now Pat. No. 11,615,472, which is a continuation of application No. 17/526,445, filed on
(Continued)

(51) Int. Cl.
   *G06Q 40/04* (2012.01)

(52) U.S. Cl.
   CPC .................................. *G06Q 40/04* (2013.01)

(58) Field of Classification Search
   USPC .......................................................... 705/37
   See application file for complete search history.

(56) References Cited

U.S. PATENT DOCUMENTS

| 5,101,353 A | 3/1992 | Lupien et al. |
| 5,560,580 A | 10/1996 | Almoslino |

(Continued)

FOREIGN PATENT DOCUMENTS

| AU | 2006/244479 | 11/2006 |
| AU | 2006/244483 | 11/2006 |

(Continued)

OTHER PUBLICATIONS

M2 Presswire, NASDAQ Launches liqudity Tracker, Itelligent order routing system allows market participants to find and increase liquidity, Dec. 2002. (Year: 2002).*

(Continued)

*Primary Examiner* — Scott C Anderson
*Assistant Examiner* — George N. Proios
(74) *Attorney, Agent, or Firm* — DLA Piper LLP (US)

(57) ABSTRACT

A tracking liquidity order and related market center and process are disclosed which allow posting market centers (e.g. exchanges) to fill routable, smaller orders that would have otherwise routed off the posting market center. Such tracking liquidity orders increase the liquidity of that posting market center and allow it to execute more orders internally, without having to route them to an away market center.

23 Claims, 9 Drawing Sheets

Related U.S. Application Data

Nov. 15, 2021, now Pat. No. 11,455,688, which is a continuation of application No. 16/729,844, filed on Dec. 30, 2019, now Pat. No. 11,216,881, which is a continuation of application No. 11/416,943, filed on May 3, 2006, now Pat. No. 10,614,520.

(60) Provisional application No. 60/678,020, filed on May 5, 2005.

(56) References Cited

U.S. PATENT DOCUMENTS

| | | | |
|---|---|---|---|
| 5,845,266 A | 12/1998 | Lupien et al. | |
| 5,905,974 A | 5/1999 | Fraser et al. | |
| 5,950,176 A | 9/1999 | Keiser et al. | |
| 6,012,046 A | 1/2000 | Lupien et al. | |
| 6,098,051 A | 8/2000 | Lupien et al. | |
| 6,278,982 B1 * | 8/2001 | Korhammer et al. | G06F 17/60 705/37 |
| 6,343,278 B1 | 1/2002 | Jain et al. | |
| 6,377,940 B2 | 4/2002 | Tilfors et al. | |
| 6,405,180 B2 | 6/2002 | Tilfors et al. | |
| 6,408,282 B1 | 6/2002 | Buist | |
| 6,505,174 B1 | 1/2003 | Keiser et al. | |
| 6,505,175 B1 * | 1/2003 | Silverman et al. | G06F 17/60 705/37 |
| 6,615,188 B1 | 9/2003 | Breen et al. | |
| 6,618,707 B1 | 9/2003 | Gary | |
| 6,714,948 B1 | 3/2004 | Richards | |
| 6,829,589 B1 | 12/2004 | Saliba | |
| 6,832,210 B1 | 12/2004 | Li | |
| 6,850,907 B2 | 2/2005 | Lutnick et al. | |
| 6,963,856 B2 | 11/2005 | Lutnick et al. | |
| 6,983,260 B2 | 1/2006 | Hummelgren | |
| 7,162,448 B2 | 1/2007 | Madoff et al. | |
| 7,184,982 B1 | 2/2007 | Howorka et al. | |
| 7,197,483 B2 | 3/2007 | Brady et al. | |
| 7,209,896 B1 | 4/2007 | Serkin et al. | |
| 7,225,153 B2 | 5/2007 | Lange | |
| 7,242,669 B2 | 7/2007 | Bundy et al. | |
| 7,246,090 B1 | 7/2007 | Thomas | |
| 7,246,093 B1 | 7/2007 | Katz | |
| 7,249,086 B2 | 7/2007 | Bloom et al. | |
| 7,356,498 B2 | 4/2008 | Kaminsky et al. | |
| 7,383,220 B1 | 6/2008 | Keith | |
| 7,401,046 B2 | 7/2008 | Hollerman et al. | |
| 7,467,110 B2 | 12/2008 | Muller et al. | |
| 7,685,057 B2 | 3/2010 | Chiulli et al. | |
| 10,614,520 B2 * | 4/2020 | Adcock et al. | G06Q 20/00 |
| 11,216,881 B2 * | 1/2022 | Adcock et al. | G06Q 40/04 |
| 11,455,688 B2 * | 9/2022 | Adcock et al. | G06Q 40/04 |
| 11,615,472 B2 * | 3/2023 | Adcock et al. | G06Q 40/04 705/37 |
| 2001/0037284 A1 | 11/2001 | Finkelstein et al. | |
| 2002/0010672 A1 | 1/2002 | Waelbroeck et al. | |
| 2002/0010673 A1 | 1/2002 | Muller et al. | |
| 2002/0019795 A1 | 2/2002 | Madoff et al. | |
| 2002/0019799 A1 | 2/2002 | Ginsberg et al. | |
| 2002/0042765 A1 | 4/2002 | Dawson | |
| 2002/0062273 A1 | 5/2002 | Perkel et al. | |
| 2002/0082979 A1 | 6/2002 | Sands et al. | |
| 2002/0091617 A1 | 7/2002 | Keith | |
| 2002/0091621 A1 | 7/2002 | Conklin et al. | |
| 2002/0120511 A1 | 8/2002 | Hanes | |
| 2002/0128951 A1 | 9/2002 | Kiron et al. | |
| 2002/0128955 A1 | 9/2002 | Brady et al. | |
| 2002/0128958 A1 | 9/2002 | Slone | |
| 2002/0143676 A1 | 10/2002 | Kiron et al. | |
| 2002/0147670 A1 | 10/2002 | Lange | |
| 2002/0161687 A1 | 10/2002 | Serkin et al. | |
| 2002/0169703 A1 | 11/2002 | Lutnick et al. | |
| 2002/0184135 A1 | 12/2002 | Zakaria | |
| 2002/0184136 A1 | 12/2002 | Cleary | |
| 2002/0198815 A1 | 12/2002 | Greifeld et al. | |
| 2002/0198816 A1 | 12/2002 | Gilbert et al. | |
| 2003/0004851 A2 | 1/2003 | Kiron et al. | |
| 2003/0004858 A1 | 1/2003 | Schmitz et al. | |
| 2003/0009400 A2 | 1/2003 | Kiron et al. | |
| 2003/0009412 A1 | 1/2003 | Furbush et al. | |
| 2003/0009413 A1 | 1/2003 | Furbush et al. | |
| 2003/0009414 A1 | 1/2003 | Furbush et al. | |
| 2003/0014351 A1 | 1/2003 | Neff | |
| 2003/0023536 A1 | 1/2003 | Hollerman et al. | |
| 2003/0040955 A1 | 2/2003 | Anaya et al. | |
| 2003/0041006 A1 | 2/2003 | Bunda | |
| 2003/0083974 A1 | 5/2003 | Bunda | |
| 2003/0093343 A1 | 5/2003 | Huttenlocher et al. | |
| 2003/0097328 A1 | 5/2003 | Lundberg et al. | |
| 2003/0115131 A1 | 6/2003 | Heaton et al. | |
| 2003/0130920 A1 | 7/2003 | Freund | |
| 2003/0130925 A1 | 7/2003 | Malitzis | |
| 2003/0130926 A1 | 7/2003 | Moore | |
| 2003/0135443 A1 | 7/2003 | Moore et al. | |
| 2003/0139998 A1 | 7/2003 | Gilbert et al. | |
| 2003/0172024 A1 | 9/2003 | Kokis et al. | |
| 2003/0177082 A1 | 9/2003 | Buckwalter | |
| 2003/0191703 A1 | 10/2003 | Chen et al. | |
| 2003/0216932 A1 | 11/2003 | Foley | |
| 2003/0229557 A1 | 12/2003 | Richmann et al. | |
| 2003/0233307 A1 | 12/2003 | Salvadori et al. | |
| 2004/0030630 A1 | 2/2004 | Tilfors et al. | |
| 2004/0044610 A1 | 3/2004 | Fraser et al. | |
| 2004/0059666 A1 | 3/2004 | Waelboeck et al. | |
| 2004/0088242 A1 | 5/2004 | Ascher et al. | |
| 2004/0143538 A1 * | 7/2004 | Korhammer et al. | G06F 17/60 705/37 |
| 2004/0143542 A1 | 7/2004 | Magill et al. | |
| 2004/0177024 A1 | 9/2004 | Bok et al. | |
| 2004/0177026 A1 | 9/2004 | Balabon | |
| 2004/0210508 A1 | 10/2004 | Bohnenberger | |
| 2004/0210511 A1 | 10/2004 | Waelbroeck et al. | |
| 2004/0215538 A1 | 10/2004 | Smith et al. | |
| 2004/0225592 A1 | 11/2004 | Churquina | |
| 2004/0236662 A1 | 11/2004 | Korhammer et al. | |
| 2004/0236669 A1 | 11/2004 | Horst et al. | |
| 2004/0243502 A1 | 12/2004 | Slowik et al. | |
| 2004/0254804 A1 | 12/2004 | Peterffy et al. | |
| 2004/0254877 A1 | 12/2004 | Buckwalter et al. | |
| 2004/0267655 A1 | 12/2004 | Davidowitz et al. | |
| 2005/0010481 A1 | 1/2005 | Lutnick et al. | |
| 2005/0075963 A1 | 4/2005 | Balabon | |
| 2005/0096999 A1 | 5/2005 | Newell et al. | |
| 2005/0119964 A1 | 6/2005 | Brady et al. | |
| 2005/0125316 A1 | 6/2005 | Lavering et al. | |
| 2005/0137962 A1 | 6/2005 | Penney et al. | |
| 2005/0160024 A1 | 7/2005 | Soderborg et al. | |
| 2005/0171887 A1 | 8/2005 | Daley et al. | |
| 2005/0171888 A1 | 8/2005 | Daley et al. | |
| 2005/0171889 A1 | 8/2005 | Daley et al. | |
| 2005/0171890 A1 | 8/2005 | Daley et al. | |
| 2005/0171891 A1 | 8/2005 | Daley et al. | |
| 2005/0171895 A1 | 8/2005 | Howorka et al. | |
| 2005/0197916 A1 | 9/2005 | Newell et al. | |
| 2005/0222936 A1 | 10/2005 | Panariti et al. | |
| 2005/0228739 A1 | 10/2005 | Leibowitz | |
| 2005/0240510 A1 | 10/2005 | Schweichert et al. | |
| 2005/0273407 A1 | 12/2005 | Black et al. | |
| 2005/0273408 A1 | 12/2005 | Bandman et al. | |
| 2005/0273419 A1 | 12/2005 | Ogg et al. | |
| 2005/0283415 A1 | 12/2005 | Studnitzer et al. | |
| 2005/0283421 A1 | 12/2005 | Hatheway et al. | |
| 2005/0283426 A1 | 12/2005 | Krishnasami et al. | |
| 2005/0283427 A1 | 12/2005 | Owens et al. | |
| 2006/0020536 A1 | 1/2006 | Renfon et al. | |
| 2006/0031157 A1 | 2/2006 | Gianakouros et al. | |
| 2006/0089898 A1 | 4/2006 | Durkin et al. | |
| 2006/0089899 A1 | 4/2006 | Durkin et al. | |
| 2006/0136318 A1 | 6/2006 | Rafieyan et al. | |
| 2006/0136326 A1 | 6/2006 | Heckman et al. | |
| 2006/0149659 A1 | 7/2006 | Carone et al. | |
| 2006/0161494 A1 | 7/2006 | Littlewood | |
| 2006/0184444 A1 | 8/2006 | McConaughy et al. | |
| 2006/0206404 A1 | 9/2006 | Hatheway et al. | |
| 2006/0206407 A1 | 9/2006 | Troxel et al. | |

(56) References Cited

U.S. PATENT DOCUMENTS

| | | |
|---|---|---|
| 2006/0235786 A1 | 10/2006 | DiSalvo |
| 2006/0253374 A1 | 11/2006 | Adcock et al. |
| 2006/0259391 A1 | 11/2006 | Schoen et al. |
| 2006/0277137 A1 | 12/2006 | Claus et al. |
| 2006/0277138 A1 | 12/2006 | Ross et al. |
| 2007/0022041 A1 | 1/2007 | Durkin et al. |
| 2007/0043647 A1 | 2/2007 | Bickford |
| 2007/0055607 A1 | 3/2007 | Wunsch et al. |
| 2007/0078753 A1 | 4/2007 | Cormack et al. |
| 2007/0112693 A1 | 5/2007 | Cushing |
| 2007/0198391 A1 | 8/2007 | Dreyer et al. |
| 2007/0244792 A1 | 10/2007 | Couperier et al. |
| 2008/0040290 A1 | 2/2008 | Harris |
| 2010/0030704 A1 | 2/2010 | Griffen et al. |
| 2010/0121759 A1* | 5/2010 | Waelbroeck et al. ... G06Q 40/04 705/37 |
| 2011/0082784 A1 | 4/2011 | Adcock et al. |

FOREIGN PATENT DOCUMENTS

| | | |
|---|---|---|
| AU | 2006/244499 | 11/2006 |
| AU | 2006/244562 | 11/2006 |
| AU | 2006/244563 | 11/2006 |
| AU | 2006/244564 | 11/2006 |
| AU | 2006/244566 | 11/2006 |
| EP | 1 321 870 | 9/2003 |
| JP | 2008/510226 | 11/2007 |
| JP | 2008/510109 | 11/2008 |
| JP | 2008/510110 | 11/2008 |
| JP | 2008/510238 | 11/2008 |
| SG | 2007/166754 | 11/2007 |
| SG | 2007/166770 | 11/2007 |
| SG | 2007/166788 | 11/2007 |
| SG | 2007/166796 | 11/2007 |
| SG | 2007/166804 | 11/2007 |
| SG | 2007/166812 | 11/2007 |
| SG | 2007/166762 | 12/2007 |
| WO | 01/22322 | 3/2001 |
| WO | 01/22339 | 3/2001 |
| WO | 01/52166 | 7/2001 |
| WO | 01/75733 | 10/2001 |
| WO | 01/90925 | 11/2001 |
| WO | 02/07039 | 1/2002 |
| WO | 02/09008 | 1/2002 |
| WO | 2004/008296 | 1/2004 |
| WO | 2005/010790 | 2/2005 |
| WO | 2005/036354 | 4/2005 |
| WO | PCTUS2006016683 | 11/2006 |
| WO | PCTUS2006016684 | 11/2006 |
| WO | PCTUS2006016685 | 11/2006 |
| WO | PCTUS2006016701 | 11/2006 |
| WO | PCTUS2006017249 | 11/2006 |
| WO | PCTUS2006017253 | 11/2006 |
| WO | PCTUS2006017296 | 11/2006 |
| WO | PCTUS2006036461 | 4/2007 |
| WO | PCTUS2006036878 | 4/2007 |
| WO | PCTUS2007016572 | 1/2008 |
| WO | PCTUS2007016682 | 1/2008 |
| WO | PCTUS2007016856 | 1/2008 |
| WO | PCTUS2007016857 | 1/2008 |
| WO | PCTUS2007016718 | 2/2008 |
| WO | PCTUS2007016571 | 3/2008 |
| WO | PCTUS2007024921 | 6/2008 |

OTHER PUBLICATIONS

Hans Degryse et al., Aggressive Orders and the Resiliency of a Limit Order Market, 2005, Review of Finance. (Year: 2005).*
Yim et al., Limit Order Placement Across Multiple Exchanges, Mar. 1, 2012, IEEE Xplore, 2012 IEEE Conference on Computational Intelligence. (Year: 2012).*
U.S. Appl. No. 11/881,789, filed Jul. 27, 2007, Adcock et al.
U.S. Appl. No. 11/881,788, filed Jul. 27, 2007, Adcock et al.
U.S. Appl. No. 11/881,064, filed Jul. 25, 2007, Adcock et al.
U.S. Appl. No. 11/880,686, filed Jul. 24, 2007, Haller et al.
U.S. Appl. No. 11/880,852, filed Jul. 24, 2007, Armstrong et al.
U.S. Appl. No. 11/634,020, filed Dec. 4, 2006, Jimenez et al.
U.S. Appl. No. 11/880,840, filed Jul. 24, 2007, Adcock et al.
U.S. Appl. No. 60/721,165, filed Sep. 28, 2005, Drake et al.
U.S. Appl. No. 11/122,679, filed May 5, 2005, Adcock et al.
U.S. Appl. No. 11/122,689, filed May 5, 2005, Adcock et al.
U.S. Appl. No. 11/345,420, filed Jan. 31, 2006, Adcock et al.
M2 Presswire, NASDAQ Launches Liquidity Tracker, Intelligent Order Routing System Allows Market Participants to Find and Increase Liquidity, Dec. 2002.
Domowitz, Ia, A Taxonomy of Automated Trade Execution Systems, Journal of International Money and Finance, (1993), 12, pp. 607-631.
Australian Patent Office Written Opinion and Search Report, mailed Dec. 1, 2008.
U.S. Appl. No. 11/525,363, filed Sep. 22, 2006, Cormack et al.
U.S. Appl. No. 11/527,797, filed Sep. 27, 2006, Drake et al.
U.S. Appl. No. 11/122,498, filed May 5, 2005, Brill et al.
U.S. Appl. No. 11/345,421, filed Jan. 31, 2006, Adcock et al.
U.S. Appl. No. 11/416,756, filed May 3, 2006, Adcock et al.
U.S. Appl. No. 11/416,913, filed May 3, 2006, Adcock et al.
U.S. Appl. No. 11/416,710, filed May 3, 2006, Adcock et al.
U.S. Appl. No. 11/416,942, filed May 3, 2006, Adcock et al.
U.S. Appl. No. 12/807,338, filed Sep. 2, 2010, Adcock.
May 2, 2011 Response to Final Rejection, for U.S. Appl. No. 11/881,789.
Jun. 13, 2011 Preliminary Amendment, for U.S. Appl. No. 12/068,881.
Apr. 4, 2011 Non-final Rejection, for U.S. Appl. No. 12/807,338.
U.S. Appl. No. 13/068,881, filed May 23, 2011, Adcock et al.
U.S. Appl. No. 12/928,292, filed Dec. 8, 2010, Adcock et al.
Feb. 17, 2011 Notice of Allowance, for U.S. Appl. No. 11/345,421.
Dec. 28, 2010 Supplemental Notice of Allowability, for U.S. Appl. No. 11/416,942.
Jan. 18, 2011 Response to Final Rejections, for U.S. Appl. No. 11/416,913.
Dec. 29, 2010 Notice of Allowance, for U.S. Appl. No. 11/634,020.
Feb. 2, 2011 Final Rejection, for U.S. Appl. No. 11/881,789.
Jan. 6, 2011 Notice of Allowance, for U.S. Appl. No. 11/881,788.
Hintze, John, Direct Order Decision Polarizes Exchanges, Security Industry News, Jun. 13, 2005, Securities Data Publishing.
Chapman, Peter, Special Feature: Fragmented Dealing Under Fire, Traders, May 1, 2000, Securities Data Publishing.
Oct. 14, 2010 Notice of Allowance, for U.S. Appl. No. 11/122,679.
Sep. 29, 2010 Notice of Allowance, for U.S. Appl. No. 11/122,498.
Oct. 13, 2010 Supplemental Notice of Allowability, for U.S. Appl. No. 11/122,498.
Dec. 9, 2010 Notice of Allowance, U.S. Appl. No. 11/345,421.
Sep. 20, 2010 Notice of Allowance, for U.S. Appl. No. 11/416,942.
Nov. 9, 2010 Supplemental Notice of Allowability, for U.S. Appl. No. 11/416,942.
Sep. 15, 2010 Final Rejection, for U.S. Appl. No. 11/416,913.
Sep. 24, 2010 Notice of Allowance, for U.S. Appl. No. 11/525,363.
Oct. 27, 2010 Notice of Allowance, for U.S. Appl. No. 11/634,020.
Ju. 11, 2009 EIC3600 Search Report, for U.S. Appl. No. 11/634,020.
Mar. 17, 2010 Restriction Requirement, for U.S. Appl. No. 11/880,840.
Mar. 26, 2010 Response to Restriction, or U.S. Appl. No. 11/880,840.
Nov. 4, 2010 Response to Non-final, for U.S. Appl. No. 11/880,840.
Dec. 7, 2010 Notice of Allowance, for U.S. Appl. No. 11/880,840.
Nov. 15, 2010 Response to Final, for U.S. Appl. No. 11/880,686.
Sep. 29, 2010 Response to Non-final, for U.S. Appl. No. 11/881,788.
Nov. 15, 2010 Notice of Allowance and Interview Summary, for U.S. Appl. No. 11/881,788.
Dec. 15, 2010 Supplemental Notice of Allowance, for U.S. Appl. No. 11/122,679.
Huant, Roger D., et al., Tick Size, Bid-Ask Spreads and Market Structure, Working Paper 99-05 Version: Fe. 8, 2001; Forthcoming Journal of Financial and Quantitatie Analysis.
Frijns, Bast, et al., Price Discovery in Tick Time, Journal of Empirical Financial, vol. 16, Issue 5, Dec. 2009, pp. 759-776.
Tseng, K.C., Supermontage as a New Trading System of NASDAQ, Investment Management and Financial Innovations, Mar. 2005.

(56) References Cited

OTHER PUBLICATIONS

Schnitzlin, Charles R., Call and Continuous Trading Mechanisms Under Asymmetric Information: An Experimental Investigation, the Journal of Finance, vol. 51, No. 2, pp. 613-663.
Dec. 14, 2009 Notice of Allowance, for U.S. Appl. No. 11/122,689.
Jan. 26, 2010 Notice of Allowance, for U.S. Appl. No. 11/122,689.
Mar. 1, 2010 Notice of Allowance, for U.S. Appl. No. 11/122,689.
Jan. 15, 2010 Notice of Allowance, for U.S. Appl. No. 11/122,679.
Aug. 16, 2010 Notice of Allowance, for U.S. Appl. No. 11/122,679.
Jul. 22, 2009 EIC2600 Search Report, for U.S. Appl. No. 11/122,679.
Jul. 2, 2009 EIC3600 Search Report, for U.S. Appl. No. 11/345,420.
Nov. 16, 2009 Notice of Allowance, for U.S. Appl. No. 11/345,420.
Sep. 7, 2010 Notice of Allowance, for U.S. Appl. No. 11/345,420.
Jan. 21, 2010 Examiner Interview, for U.S. Appl. No. 11/122,498.
Jun. 16, 2010 Response to Final, for U.S. Appl. No. 11/122,498.
Jul. 1, 2010 Notice of Allowance, for U.S. Appl. No. 11/122,498.
Aug. 31, 2010 Notice of Allowance, for U.S. Appl. No. 11/122,498.
Sep. 14, 2010 Notice of Allowance, for U.S. Appl. No. 11/122,498.
Apr. 2, 2010 Notice of Allowance, for U.S. Appl. No. 11/345,421.
Aug. 4, 2010 Notice of Allowance, for U.S. Appl. No. 11/345,421.
Dec. 29, 2009 Notice of Allowance, for U.S. Appl. No. 11/416,942.
Jan. 26, 2010 Notice of Allowance, for U.S. Appl. No. 11/416,942.
Feb. 24, 2010 Notice of Allowance, for U.S. Appl. No. 11/416,942.
Jun. 16, 2010 Notice of Allowance, for U.S. Appl. No. 11/416,942.
Mar. 22, 2010 Notice of Allowance, for U.S. Appl. No. 11/416,710.
Jun. 15, 2010 Notice of Allowance, for U.S. Appl. No. 11/416,710.
Jan. 30, 2009 Austrian Patent Office Search Report and Written Opinion, for SG 200716681-2.
Jan. 22, 2010 Nonfinal Rejection, for U.S. Appl. No. 11/416,913.
Jun. 22, 2010 Response to Final Rejection, for U.S. Appl. No. 11/416,913.
Apr. 27, 2010 Final Rejection, for U.S. Appl. No. 11/416,756.
Jul. 6, 2010 Proposed Examiner's Amendment, for U.S. Appl. No. 11/525,363.
Jan. 25, 2010 Final Rejection, for U.S. Appl. No. 11/527,797.
Aug. 3, 2010 Notice of Abandonment, for U.S. Appl. No. 11/527,797.
Dec. 28, 2009 Final Rejection, for U.S. Appl. No. 11/634,020.
Mar. 16, 2010 Response to Final, for U.S. Appl. No. 11/634,020.
Apr. 28, 2010 Nonfinal Rejection, for U.S. Appl. No. 11/634,020.
Jul. 28, 2010 Response to Office Action, for U.S. Appl. No. 11/634,020.
Jul. 6, 2010 Nonfinal Rejection, for U.S. Appl. No. 11/880,840.
May 3, 2010 Response to Nonfinal Rejection, for U.S. Appl. No. 11/880,686.
Jul. 21, 2010 Final Office Action, for U.S. Appl. No. 11/880,686.
Aug. 18, 2008 Final Rejection, for U.S. Appl. No. 11/880,852.
Jun. 30, 2010 Nonfinal Rejection for U.S. Appl. No. 11/881,064.
Dec. 1, 2009 Nonfinal Rejection for U.S. Appl. No. 11/881,789.
Mar. 19, 2010 Response to Nonfinal Rejection, for U.S. Appl. No. 11/881,789.
Aug. 20, 2010 Restriction Requirement, for U.S. Appl. No. 11/881,789.
Sep. 2, 2010 Response to Restriction Requirement, for U.S. Appl. No. 11/881,789.
Jun. 29, 2010 Nonfinal Rejection, for U.S. Appl. No. 11/881,788.
International Search Report and Written Opinion, PCT/US07/16856, Nov. 10, 2008.
International Search Report for PCT/US06/16685, Sep. 17, 2007.
International Preliminary Report on Patentability, PCT/US2007/016572, Apr. 23, 2009.
International Preliminary Report on Patentability, PCT/US2007024921, Jun. 18, 2009.
McKinnion, Julie M., Toldeo Ohio-Based Dana Corp. Could Lose NYSE Listing in Takeover Battle, the Blade, Aug. 3, 2003.
Young, Lee, W., International Search Report May 18, 2007, 4 pages.
International Search Report, Mar. 20, 2008 for PCT/US2007/016718.
Young, Lee, W., International Search Report Aug. 9, 2007, 6 pages.
Young, Lee, W., International Search Report Aug. 29, 2007, 7 pages.
Young Lee, W., International Search Report Sep. 5, 2007, 8 pages.
Young Lee, W., International Search Report Sep. 7, 2007, 5 pages.
Young, Lee, W., International Search Report Sep. 29, 2007, 6 pages.
International Search Report, Jul. 2, 2008 for PCT/US2007/016572.
Australian Patent Office Written Opinion and Search Report, mailed Jan. 9, 2009.
Australian Patent Office Written Opinion and Search Report, mailed Feb. 13, 2009.
Austrian Patent Office Search Report and Written Opinion, mailed Mar. 6, 2009.
Austrian Patent Office Search Report and Written Opinion, mailed Mar. 13, 2009.
Notice of Allowance and Examiner's Amendment for U.S. Appl. No. 11/345,420.
Phlx Allows Floor Broker Crossing, Wall Street Letter, New York, Feb. 24, 2003, p. 1.
Anonymous, Rising tide lifts all boats in institutional equities, the Investment Dealer's Digest: IDD, New York, Mar. 28, 1994, vol. 60, Iss. 13, p. 16, 5 pages.
Headstrong Buys Assets of Elind Software Provider; Noticiasfinancieras, Miami Nov. 1, 2004, p. 1.
Non-Final Rejection, Feb. 26, 2008.
Response to Non-Final, Aug. 29, 2008 for U.S. Appl. No. 11/122,689.
Final Rejection, Nov. 18, 2008 for U.S. Appl. No. 11/122,689.
Response to Final, Mar. 17, 2009 for U.S. Appl. No. 11/122,689.
Examiner Interview, Apr. 13, 2009 for U.S. Appl. No. 11/122,689.
Non-Final Rejection, Apr. 27, 2009 for U.S. Appl. No. 11/122,689.
Non-Final Rejection, Apr. 1, 2008 for U.S. Appl. No. 11/122,679.
Response to Non-Final, Oct. 6, 2008 for U.S. Appl. No. 11/122,679.
Non-Final Rejection, Jan. 5, 2009 for U.S. Appl. No. 11/122,679.
Response to Non-Final Rejection, Apr. 6, 2009 for U.S. Appl. No. 11/122,679.
Examiner Interview, May 4, 2009 for U.S. Appl. No. 11/122,679.
Response to Non-Final, Jun. 17, 2009 for U.S. Appl. No. 11/122,679.
Non-Final Rejection, Dec. 9, 2008 for U.S. Appl. No. 11/345,420.
Notice of Allowance, Jul. 23, 2009 for U.S. Appl. No. 11/345,420.
Non-Final Rejection, Feb. 12, 2008 for U.S. Appl. No. 11/122,498.
Response to Non-Final Rejection, Aug. 14, 2008, for U.S. Appl. No. 11/122,498.
Final Rejection, Sep. 19, 2008 for U.S. Appl. No. 11/122,498.
Response to Final Rejection, Jan. 9, 2009 for U.S. Appl. No. 11/122,498.
Non-Final Rejection, Apr. 15, 2009 for U.S. Appl. No. 11/122,498.
Non-Final Rejection, Jun. 27, 2008 for U.S. Appl. No. 11/345,421.
Response to Non-Final Rejection, Sep. 22, 2008 for U.S. Appl. No. 11/345,421.
Final Rejection, Jan. 26, 2009 for U.S. Appl. No. 11/345,421.
Response to Final Rejection, May 22, 2009 for U.S. Appl. No. 11/345,421.
Non-Final Rejection, Sep. 30, 2008 for U.S. Appl. No. 11/416,942.
Response to Non-Final Rejection, Jan. 12, 2009 for U.S. Appl. No. 11/416,942.
Final Rejection, Apr. 23, 2009 for U.S. Appl. No. 11/416,942.
Non-Final Rejection, Apr. 4, 2008 for U.S. Appl. No. 11/416,710.
Informal Response to Non-Final Rejection, Aug. 4, 2008 for U.S. Appl. No. 11/416,710.
Notice to Applicant re: Informal Response to Non-Final Rejection, Sep. 11, 2008 for U.S. Appl. No. 11/416,710.
Response to Non-Final Rejection, Sep. 19, 2008 for U.S. Appl. No. 11/416,710.
Non-Final Rejection, Dec. 30, 2008 for U.S. Appl. No. 11/416,710.
Response to Non-Final Rejection, Mar. 27, 2009 for U.S. Appl. No. 11/416,710.
Non-Final Rejection, Dec. 29, 2008 for U.S. Appl. No. 11/416,913.
Response to Non-Final Rejection, Mar. 25, 2009 for U.S. Appl. No. 11/416,913.
Final Rejection, Aug. 3, 2009 for U.S. Appl. No. 11/416,913.
Restriction Requirement, Mar. 27, 2009 for U.S. Appl. No. 11/416,756.
Response to Non-Final Rejection, Apr. 27, 2009 for U.S. Appl. No. 11/416,756.
Non-Final Rejection, Aug. 4, 2009 for U.S. Appl. No. 11/416,756.
International Search Report, Jun. 17, 2008 for PCT/US2007/016682.
International Search Report, Sep. 18, 2008 for PCT/US2007/016856.

(56) References Cited

OTHER PUBLICATIONS

International Search Report, Nov. 10, 2008 for PCT/US2007/016856.
International Search Report, Sep. 5, 2008 for PCT/US2007/016857.
Non-Final Rejection, May 19, 2009 for U.S. Appl. No. 11/525,363.
International Search Report, Jun. 17, 2008 for PCT/US2006/036461.
Non-Final Rejection, Sep. 15, 2008 for U.S. Appl. No. 11/527,797.
Response to Non-Final Rejection, Dec. 15, 2008 for U.S. Appl. No. 11/527,797.
Final Rejection, Mar. 30, 2009 for U.S. Appl. No. 11/527,797.
Response to Final Rejection, May 19, 2009 for U.S. Appl. No. 11/527,797.
Non-Final Rejection, Nov. 12, 2008 for U.S. Appl. No. 11/634,020.
Response to Non-Final Rejection, Feb. 17, 2009 for U.S. Appl. No. 11/634,020.
Non-Final Rejection, Jun. 24, 2009 for U.S. Appl. No. 11/634,020.
International Search Report, May 12, 2008 for PCT/US2007/024921.
International Search Report, Jun. 17, 2008 for PCT/US2007/016571.
Non-Final Rejection, Oct. 7, 2009 for U.S. Appl. No. 11/345,421.
Response to Non-Final Rejection, Nov. 23, 2009 for U.S. Appl. No. 11/345,421.
Response to Final Rejection, Oct. 7, 2009 for U.S. Appl. No. 11/416,942.
Examiner Interview Summary Record, Oct. 14, 2009 for U.S. Appl. No. 11/416,942.
Response to Non-Final Rejection, Nov. 4, 2009 for U.S. Appl. No. 11/416,756.
Examiner Interview Summary Record, Aug. 18, 2009 for U.S. Appl. No. 11/122,689.
Response to Non-Final Rejection, Aug. 27, 2009 for U.S. Appl. No. 11/122,689.
Notice of Allowance, Aug. 21, 2009 for U.S. Appl. No. 11/122,679.
Examiner Interview Summary Record, Sep. 9, 2009 for U.S. Appl. No. 11/122,679.
Examiner Interview Summary Record, Aug. 18, 2009 for U.S. Appl. No. 11/122,498.
Response to Non-Final Rejection, Sep. 15, 2009 for U.S. Appl. No. 11/122,498.
Response to Final Rejection, Sep. 30, 2009 for U.S. Appl. No. 11/416,942.
Examiner Interview Summary Record, Mar. 31, 2009 for U.S. Appl. No. 11/416,943.
Non-Final Rejection, Sep. 30, 2009 for U.S. Appl. No. 11/416,943.
NASDAQ Launches Liquidity Tracker, HighBeam Research, Dec. 5, 2002.
Response to Non-Final Rejection, Sep. 29, 2009 for U.S. Appl. No. 11/634,020.
Response to Final Rejection, Oct. 19, 2009 for U.S. Appl. No. 11/416,913.
Non-Final Rejection, Aug. 17, 2009 for U.S. Appl. No. 11/416,710.
Response to Non-Final Rejection, Nov. 2, 2009 for U.S. Appl. No. 11/416,710.
International Search Report, Oct. 14, 2009 for 2007166754SG.
International Search Report, Oct. 2, 2009 for 2007166812SG.
Young, Lee W., International Search Report, Sep. 12, 2007, 6 pages.
Hans Degryse, et al., Aggressive Orders and the Resiliency of a Limit Order Market, Review of Finance, 2005.
Yim et al., IEEE Xplore, Limit Order Placement Across Multiple Exchanges, IEEE Conference on Computational Intelligence, Mar. 1, 2012.

\* cited by examiner

TRACKING LIQUIDITY ORDER

BACKGROUND

Typically, when a trader sends an order to a specific market center (e.g., an exchange), that market center, to the extent it can, executes the order itself. One instance where a market center is not allowed to execute an order sent to it is where that market center is not at the national best bid or offer ("NBBO"). In that situation, the market center receiving the order is required to send, or route, the order to the away market center that is at the NBBO. In the current marketplace structure, however, when an order is routed to a market center with a trading floor, the routed order is seen by the floor, giving participants as much as 30 seconds to decide whether they want to trade against the order or not. During that interval, market prices can move quickly, causing a disadvantage to the trader whose order was routed. The routed order has exposed its price, has been unavailable for other matching opportunities during that time interval and, in the end, may not receive a fill anyway. Accordingly, there is a need for an order type that increases the liquidity on a posting market center and thereby reduces the number of orders that need to route off that market center for execution.

However, although liquidity providers such as Market Makers are willing to interact with smaller-sized incoming orders to prevent them from routing, such as orders sent by retail customers, these liquidity providers may be unwilling to be swept by large incoming orders, which are typically sent by more "informed" market participants such as institutional firms. Institutional firms often employ algorithmic front-end "smart router" systems that look for hidden liquidity on market centers by sending an order that exceeds the size of a market center's published bid or offer. By doing so, they not only execute against all marketable displayed trading interest, they can also execute against all marketable nondisplayed trading interest, such as the portions of orders kept in reserve. If an incoming order is large enough to execute not only against all the displayed interest, but also against all the nondisplayed interest as well, then some liquidity providers may not wish to participate in the execution.

Accordingly, there is a need for an order type which intercepts orders that are about to be routed off that market center for execution on another market, which order type, at the same time, does not allow the orders provided by the liquidity provider to be swept by large incoming orders. Thus, the order types needed provide a fill of last resort that prevents any portion of the appropriately sized incoming order from routing.

SUMMARY

According to an aspect of the present invention, a method for increasing internal order fills on a market center includes providing a market center with displayed orders and posting a tracking liquidity order on a posting market center, wherein the tracking liquidity order has a hidden price and size component. The method further includes the automatic pricing of the tracking liquidity orders according to the present values of the national best bid and offer, wherein buy orders track the national best bid and sell orders track the national best offer. The method further includes reviewing orders coming into the market center to determine if the orders are routable and whether the size of the incoming orders is not greater than the size component of the tracking liquidity order. Wherein if an incoming order is routable and its current executable quantity does not exceed the size of the tracking liquidity order, the method executes the incoming order against the tracking liquidity order.

DESCRIPTION OF THE DRAWINGS

These and other features, aspects and advantages of the present invention will become better understood with regard to the following description, appended claims and accompanying drawings where:

DETAILED DESCRIPTION

Figure 1:
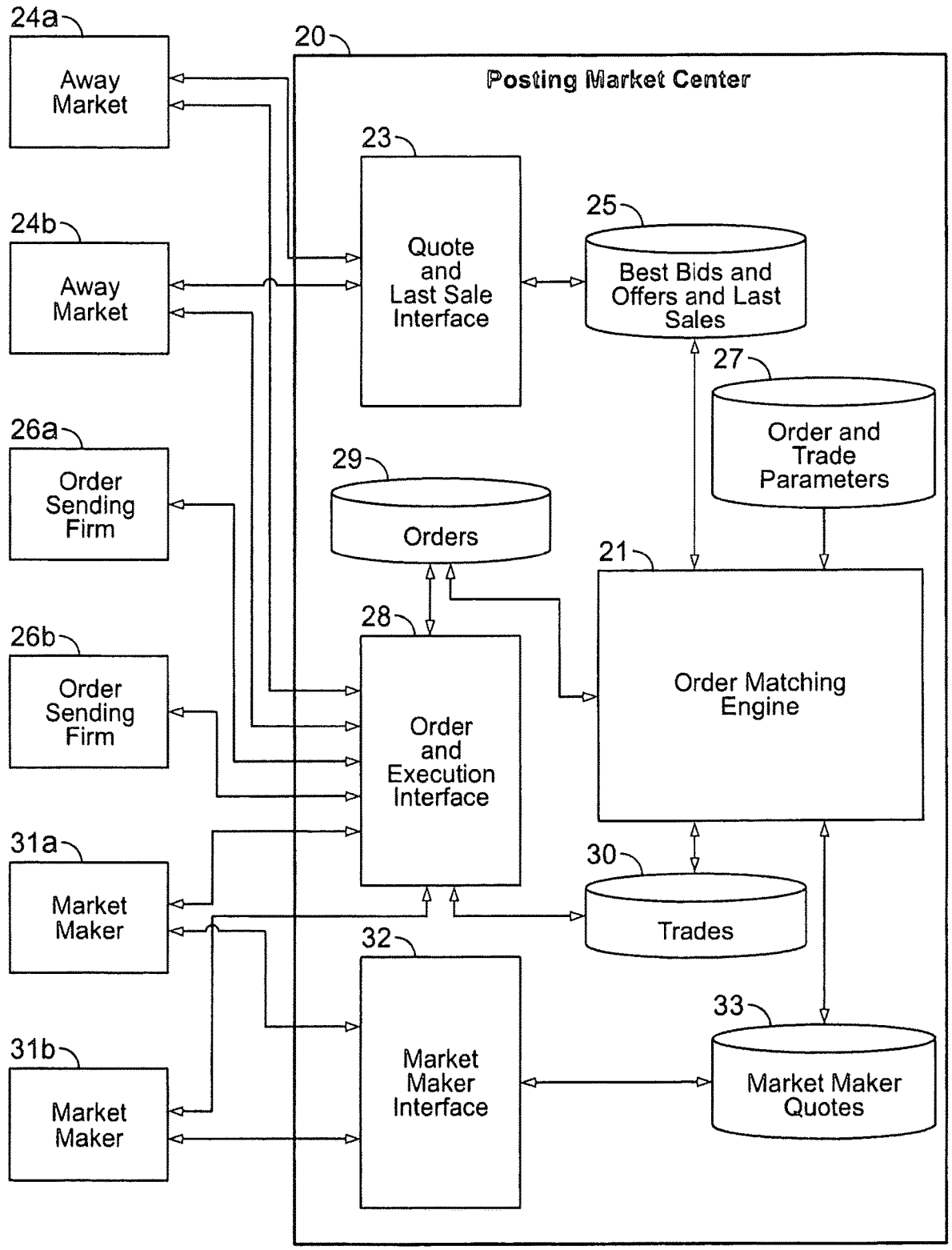
FIG. 1 is a block diagram illustrating the trading environment in which an embodiment of the present invention operates.

Referring to FIG. 1, a trading environment in which an embodiment of the system and method of the present invention operates is depicted. The examples discussed herein describe the use and application of the present invention in an equity security market center environment, but it should be understood that the present invention could be used in any type of financial instrument market center environment (e.g., equities, futures, options, bonds, etc.). The trading environment of this embodiment includes a posting market center 20 which interacts with a number of other market centers 24 (i.e. away markets), traders at order ending firms 26 and Market Makers 31. It should be understood that the trading environment of this embodiment supports but does not require Market Makers 31, a Market Maker Interface 32, or Market Maker Quotes 33. It should also be understood that the posting market center 20 referred to herein refers to a computing system having sufficient processing and memory capabilities and does not refer to a specific physical location. In fact, in certain embodiments, the computing system may be distributed over several physical locations. It should also be understood that any number of traders 26 or Market Makers 31 or away market centers 24 can interact with the posting market center 20. The posting market center 20 is the market center on which a specific trader 26 posts a specific order, and on which a specific Market Maker 31 posts a specific quote. The posting market center 20 includes an order matching engine 21, which validates, matches and processes all orders and quotes on the posting market center 20. In this embodiment, the code for the order matching engine 21 is stored in the posting market center's memory.

The posting market center 20 may also include a quote and last sale interface 23 that interacts with the away market centers 24 to capture quote and last sale information. This information is stored to a best bids and offers data structure 25. This data structure 25 is where the market best bid and offer and last sale information is stored. This data structure 25 is also where the market trade reports (prints) are stored. The posting market center 20 may also include an order and trade parameters data structure 27. The order and trade parameters data structure 27 stores pre-defined trading parameters and rules that are used by the order matching engine 21 in matching orders and executing trades. The posting market center 20 may also include an order and execution interface 28 which interacts with the traders 26, the Market Makers 31, the away market centers 24 and the order matching engine 21 in the order execution process. The posting market center 20 may also include an order information data structure 29 where order information is stored and a trade information data structure 30 where completed trade information is stored. The posting market center 20 may also include a Market Maker interface 32 that interacts with Market Makers 31 to capture Market Maker bids and offers in assigned issues. These bids and offers are logically depicted in a Market Maker Quotes structure 33 in this illustration. In actuality, the Market Maker bids and offers may physically reside in the away market center best bids and offers data structure 25.

Throughout the discussion herein, it should be understood that the details regarding the operating environment, data structures, and other technological elements surrounding the posting market center 20 are by way of example and that the present invention may be implemented in various differing forms. For example, the data structures referred to herein may be implemented using any appropriate structure, data storage, or retrieval methodology (e.g., local or remote data storage in data bases, tables, internal arrays, etc.). Furthermore, a market center of the type described herein may support any type of suitable interface on any suitable computer system.

Order Matching Engine and Order Execution Processes

For every order type processed on the posting market center 20, the order matching engine 21 determines how to rank the order in its "internal book" according to whether the order is disclosed, partially disclosed or not disclosed at all to the marketplace. The internal book is a virtual book of all orders resting on the posting market center. For purposes of the examples in this document, the Top-of-Book best bid and offer ("BBO") quotes from each protected away market center may also be included in the internal book, regardless of whether they actually reside in a different table or not. In this embodiment, an order that is fully disclosed to the marketplace has higher matching priority than an order at the same price level that is partially disclosed or not disclosed. In this embodiment, trading interest resident on the posting market center always has priority over away market interest at the same price level. However, in the case where Tracking Liquidity Orders are present on the posting market center 20 but no single Tracking Liquidity Order has sufficient size to fully intercept an incoming order, then the Tracking Liquidity Orders are not required to interact with the incoming order even though the Tracking Liquidity Orders have priority over away market interest at the same price level, and the incoming order will route to an away market instead of executing on the posting market center 20.

The most common example of an order type that is fully disclosed is a simple limit order. The most common example of an order type that is partially disclosed and partially nondisclosed is an order with reserve shares (i.e. a Reserve Order). The Tracking Liquidity Order of the present invention described herein is one of the few order types that is never disclosed (i.e. is completely hidden from the marketplace). Orders that must execute immediately (e.g., Market Orders and IOC orders) are not included in this discussion of order ranking.

A Tracking Liquidity Order is a nondisplayed order priced by the NBBO that can only execute on the posting market center 20 and does not route out to other away market centers. As a Tracking Liquidity Order has a nondisplayed size, reserve functionality is not available for this order type. Similarly, as a Tracking Liquidity Order has a nondisplayed price, discretionary functionality is also not available for this order type. As a Tracking Liquidity Order is automatically pegged to the same side of the NBBO, the limit price specified on the order serves only to define the maximum price (ceiling) to which a Tracking Liquidity Buy Order will follow the NBB, or the minimum price (floor) to which a Tracking Liquidity Sell Order will follow the NBO.

As a Tracking Liquidity Order can only execute with orders about to route off the posting market center 20 and is never itself eligible for routing, a Tracking Liquidity Buy Order can never execute against a Tracking Liquidity Sell Order. This is true even if their current executable prices are equal or overlapping as a result of the orders having followed the NBBO into a lock or cross. It should also be noted that the requirement for executing only against routable orders means that a Tracking Liquidity Order cannot match with incoming orders or commitments received from away market centers 24, as the posting market center 20 does not presently re-route orders or commitments it receives from other market centers 24.

If the posting market center 20 has Odd Lot Dealers or supports Odd Lot functionality, then Tracking Liquidity Orders may only be entered in round lot denominations in those instruments (e.g., equity securities). Odd Lot Dealer functionality is outside the scope of this invention. However, a Tracking Liquidity Order will interact with an incoming order whose Leaves quantity is an odd lot size or a mixed lot size, providing the size is less than the Tracking Liquidity Order.

In a preferred, but not limiting, embodiment of the present invention, usage of a Tracking Liquidity Order in some issues may be restricted to certain market participants. For example, it may be limited to the Lead Market Maker in issues that trade exclusively on the posting market center 20 or may be limited to appointed Market Makers in issues that are traded on multiple market centers. In a preferred, but not limiting, embodiment of the present invention, usage of a Tracking Liquidity Order in issues that are traded on multiple market centers may also be extended to market participants such as broker/dealers or firms 26, but only with the provision that they can submit a Tracking Liquidity Order on one side of the market only (i.e., a Tracking Liquidity Buy Order or a Tracking Liquidity Sell Order, but not both sides in the same issue), to prevent such market participants from engaging in behavior that could be construed as "market making" without actually being appointed as Market Makers 31 on the posting market center 20.

In a preferred embodiment of the present invention, Tracking Liquidity Orders continue to peg to the NBBO even if the NBBO should become locked or crossed, (i.e., NBB equal to the NBO, or NBB higher than the NBO, respectively) and will execute at such locked/crossed price. In a different embodiment of the present invention, Tracking Liquidity Orders may cease pegging to the NBBO should the NBBO become locked or crossed and may instead remain active at their present prices or else may be momentarily rendered ineligible for trading until such time as the NBBO becomes unlocked and/or uncrossed.

When the posting market center 20 of this embodiment of the present invention receives an incoming order, it delivers it to one of several Order Execution "Processes" implemented by the order matching engine 21. In this embodiment, the following Order Execution Processes are supported for all issues:

Display Process
Working Process
    Reserve Process sublevel
    Liquidity Process sublevel (optional—see below)
    Discretionary Process sublevel
Tracking Process
Routing Process In this implementation of the invention, the Liquidity Process sublevel is supported only if the proprietary order type known as a Passive Liquidity Order is currently operable on the posting market center 20. It should be noted that the Tracking Liquidity Orders of the present invention operate as described even if no orders are present or supported in the Working Process level.

Referring to the first level, the Display Process is at the heart of the posting market center order matching engine and effects the ranking of displayed nonmarketable limit orders on a strict price/time priority basis. Referring to the second level, the Working Process includes the Reserve Process sublevel for reserve orders; the optional Liquidity Process sublevel for Passive Liquidity Orders; and the Discretion Process sublevel for discretionary orders. Referring to the third level, the Tracking Process stores all Tracking Liquidity Orders in a strict price/time priority basis. At any given price level, displayed resident interest has priority over nondisplayed resident interest in this embodiment.

Market Maker Processes

If an issue has appointed Market Makers, the posting market center may also support a Lead Market Maker Guarantee Process and/or a Directed Order Process, wherein such processes would precede the Display Process and have the highest matching priority. Market Maker quotes not eligible for execution in the Lead Market Maker Guarantee Process or the Directed Order Process are eligible for execution in the Display Process instead, where the quotes are ranked in strict price/time priority with displayed limit orders on the book even though they reside in separate tables. The matching priority of Tracking Liquidity Orders in relation to Market Maker quotes is described in this document and illustrated by means of several examples.

Tracking Liquidity Order Execution Priority on the Posting Market Center

When the order matching engine 21 processes a non-marketable order, it inserts the non-marketable order into the appropriate processing level of the posting market center order book according to the trading rules that govern that order type. In this embodiment, the order matching engine 21 determines the processing level that the received non-marketable order should be placed into according to the following rules:

Fully-disclosed orders are inserted in the Display Process only. Orders are ranked in the Display Process according to strict price/time priority;

Reserve Orders are inserted in the Display Process and the Working Process. The disclosed portion resides in the Display Process and is ranked according to strict price/time priority. The undisclosed (reserve) size resides in the Reserve Process sublevel, and is ranked according to the price/time priority of the displayed component;

Passive Liquidity Orders, if supported, are inserted in the Working Process only. The entire order resides in the Liquidity Process sublevel. Passive Liquidity Orders are ranked according to strict price/time priority within the Liquidity Process;

Discretionary Orders are inserted in the Display Process and the Working Process. The disclosed portion resides in the Display Process and is ranked according to strict price/time priority. The undisclosed (discretionary) price resides in the Discretion Process sublevel, and is ranked according to the price/time priority of the displayed component; and Tracking Liquidity Orders are inserted in the Tracking Process only. Orders are ranked in the Tracking Process according to strict price/time priority.

An exception to the price/time priority model described above exists for issues with assigned Market Makers. In some embodiments, under prescribed conditions, customer orders and/or Lead or Designated Market Makers quotes may be granted time priority over other resident trading interest at the same price.

It should be understood that the description of the ranked Order Execution Processes and sub-processes herein is only meant to illustrate the logical processing concepts and does not imply a physical implementation. The purpose of describing separate processes is to illustrate how various order types have priority over other order types within the order matching engine 21.

In this embodiment, when the order matching engine 21 acts to trade orders in the book, it attempts to execute an incoming order according to the priority of its Order Execution Processes. If an order is received in an issue with appointed Market Makers, the order matching engine 21 generally attempts to execute in the Lead Market Maker Guarantee Process or the Directed Order Process first. If an order cannot be executed in either process, or if an order is partially executed but still has quantity remaining to trade, then the order matching engine 21 looks to the Display Process next. If orders reside in the Display Process level at the best price point, it matches those orders first. If the order matching engine 21 exhausts all orders in the Display Process level at that price point, then it moves to the Reserve Process level next. If it exhausts all orders in the Reserve Process level at that price point, then it moves to the Liquidity Process level next. If it exhausts all orders in the Liquidity Process level at that price point, then it moves to the Discretion Process level next. If it exhausts all orders in the Discretion Process level at that price point and the incoming order is eligible for routing, then it moves to the Tracking Process level next. If it cannot execute the order in the Tracking Process, then it moves to the Routing Process and routes the order off the posting market center 20 to one or more away market centers.

The table below represents an embodiment of the buy side of the internal book of the posting market center 20 (an equivalent table exists for the sell side of the book):

| Price point | Display | Reserve | Liquidity | Discretion | Tracking | Routing |
|---|---|---|---|---|---|---|
| Price n | Highest priority | Second priority | Third priority | Fourth priority | Fifth priority | Lowest priority |

If the implementation of the present invention does not support Passive Liquidity Orders, then the embodiment of the buy side of the internal book looks like this instead:

| Price point | Display | Reserve | Discretion | Tracking | Routing |
|---|---|---|---|---|---|
| Price n | Highest priority | Second priority | Third priority | Fourth priority | Lowest priority |

In the examples used throughout this document, away market quotes (i.e., the Best Bid and Offer Top of Book quotes in data structure 25 disseminated by each protected away market 24) are shown as logically residing in the Routing Process. The purpose of this is to demonstrate that the Routing Process has the lowest priority for order execution at any given price level.

Example: Ranking of Order Types at the Same Price Point

To illustrate how orders are conceptually inserted within each of these process levels, the following example starts with an empty book for the buy side which is then populated with different order types at the same price.

In this example, the posting market center 20 detects the following bid from Away Market Center A:

Bid 3000@20.00

In this illustration, away market quotes are shown residing in the internal book to indicate their relative ranking compared to orders residing in other Order Execution Processes. This illustration is a logical depiction only and does not imply a physical structure. In an actual trading environment, the away market quotes may reside in a separate table. The posting market center's internal book looks like this:

| Price point | Display | Reserve | Liquidity | Discretion | Tracking | Routing |
|---|---|---|---|---|---|---|
| 20.00 | | | | | | Market A: 3000 @ 20.00 |

Away Market A establishes the NBB at the price of $20.00 in this example.

The posting market center 20 receives the following simple limit order:

Order A: Buy 1000@20.00

As this order is to be fully disclosed, the order matching engine 21 inserts the order in the Display Process level only. The posting market center's internal book looks like this:

| Price point | Display | Reserve | Liquidity | Discretion | Tracking | Routing |
|---|---|---|---|---|---|---|
| 20.00 | Order A: 1000 @ 20.00 | | | | | Market A: 3000 @ 20.00 |

The posting market center 20 next receives this Reserve Order:

Order B: Buy 8000@20.00, Show size=500, Reserve size=7500

As this order is to be partially disclosed (Show size=500) and partially non-disclosed (Reserve size=7500), the order matching engine 21 inserts the order in the Display Process level and the Reserve Process level. The book, at this point, looks like this:

| Price point | Display | Reserve | Liquidity | Discretion | Tracking | Routing |
|---|---|---|---|---|---|---|
| 20.00 | Order A: 1000 @ 20.00 Order B: 500 @ 20.00 | Order B: 7500 @ 20.00 | | | | Market A: 3000 @ 20.00 |

The posting market center 20 next receives this Passive Liquidity Order:

Order C: Buy 9000@20.00, Passive Liquidity

The order matching engine 21 inserts this order in the Liquidity Process level. The internal book looks like this:

| Price point | Display | Reserve | Liquidity | Discretion | Tracking | Routing |
|---|---|---|---|---|---|---|
| 20.00 | Order A: 1000 @ 20.00 Order B: 500 @ 20.00 | Order B: 7500 @ 20.00 | Order C: 9000 @ 20.00 | | | Market A: 3000 @ 20.00 |

The posting market center 20 next receives this Discretionary Order:

Order D: Buy 2000@19.99, with discretion to 20.01

A Discretionary Order is another example of an order that has a disclosed component and a non-disclosed component. In this case, the disclosed component is the displayed price and size, and the non-disclosed component is the most aggressive price that the order is willing to "step up" to if necessary to effect a trade. This is its discretionary price.

The order matching engine 21 inserts Order D in the Display Process level as 2000 shares at the price point of $19.99, its display price. It also "inserts" links to Order D in the Discretion Process level at the price points up to and including $20.01, its discretionary price. Although in the Table below, Order D may appear to reside in multiple cells, it only resides in the Display Process, where it is ranked according to price/time priority like any other displayed order. The Table merely illustrates that Order D can also "step up" to the prices of $20.00 and $20.01 if necessary to effect a trade.

The order matching engine 21 inserts this order in the Discretion Process level. The internal book conceptually looks like this:

| Price point | Display | Reserve | Liquidity | Discretion | Tracking | Routing |
|---|---|---|---|---|---|---|
| 20.01 | | | | Order D: 2000 @ 20.01 | | |
| 20.00 | Order A: 1000 @ 20.00 | Order B: 7500 @ 20.00 | Order C: 9000 @ 20.00 | Order D: 2000 @ 20.00 | | Market A: 3000 @ 20.00 |
| | Order B: 500 @ 20.00 | | | | | |
| 19.99 | Order D: 2000 @ 19.99 | | | | | |

As Discretionary prices are not displayed to the marketplace, it is important to note that the posting market center 20 Best Bid (and hence the NBB also) is still $20.00, not $20.01.

The posting market center 20 next receives this Tracking Liquidity Order:

Order E: Buy 1000@20.01, Tracking Liquidity Order

Unlike Discretionary Order D, Tracking Liquidity Order E is inserted in the internal book at one price level only—the NBB price, which is currently $20.00. The reason for this is because Tracking Liquidity Order E cannot trade at a price higher than the NBB according to the rules governing the order type. In contrast, Discretionary Order D can "step up" to the price of $20.01 to intercept an incoming sell order priced at $20.01. Tracking Liquidity Order E's price of $20.01 indicates that it can peg to the NBB up to $20.01, it does not mean that Order E can execute up to $20.01 at any time. In fact, the only time Order E can execute at $20.01 is when the NBB is $20.01.

The order matching engine 21 inserts this order in the Tracking Process level. The highest pegging price for the order, i.e., it's user-specified limit price, is stored as its "MaxPrice." The internal book conceptually looks like this:

| Price point | Display | Reserve | Liquidity | Discretion | Tracking | Routing |
|---|---|---|---|---|---|---|
| 20.01 | | | | Order D: 2000 @ 20.01 | | |
| 20.00 | Order A: 1000 @ 20.00 | Order B: 7500 @ 20.00 | Order C: 9000 @ 20.00 | Order D: 2000 @ 20.00 | Order E: 1000 @ 20.00, MaxPrice = 20.01 | Market A: 3000 @ 20.00 |
| | Order B: 500 @ 20.00 | | | | | |
| 19.99 | Order D: 2000 @ 19.99 | | | | | |

An incoming order to Sell 21,000@20.00 would:

Trade all the orders priced at $20.00 in the Display Process level first (1000 shares of Order A, and 500 shares of Order B);

Trade all the orders priced at $20.00 in the Reserve Process level next (7500 reserve shares of Order B);

Trade all the orders priced at $20.00 in the Liquidity Process level next (9000 shares of Order C);

Trade all the orders that can step up to $20.00 in the Discretionary Process level next (2000 shares of Order D); and Trade Order E at $20.00 in the Tracking Process, as Order E has sufficient size to intercept the remaining 1000 shares of the incoming Sell order.

In contrast, an incoming order to Sell 21,001@20.00 (i.e., an order whose size is one share larger than in the previous example) would:

Trade all the orders priced at $20.00 in the Display Process, Reserve Process, Liquidity Process, and Discretionary Process, exactly as described above; and Route the remaining 1001 shares of the incoming Sell Order to Away Market A at $20.00 in the Routing Process, as Tracking Liquidity Order E does not have sufficient size (1000 shares) to fully intercept the remaining 1001 shares of the incoming Sell order.

Example: Ranking of Order Types at Different Price Points

Even though the Tracking Liquidity Orders of the present invention trade behind all orders with the same displayed price, all orders are ranked first by price priority. This means a nondisplayed order trades ahead of displayed orders if the displayed orders have inferior prices.

In this example, the internal book contains the same orders as in the previous examples. However, Away Market A has just increased its bid price to $20.01, as shown below:

| Price point | Display | Reserve | Liquidity | Discretion | Tracking | Routing |
|---|---|---|---|---|---|---|
| 20.01 | | | | Order D: 2000 @ 20.01 | | Market A: 3000 @ 20.01 |
| 20.00 | Order A: 1000 @ 20.00 | Order B: 7500 @ 20.00 | Order C: 9000 @ 20.00 | Order D: 2000 @ 20.00 | Order E: 1000 @ 20.00, MaxPrice = 20.01 | |
| | Order B: 500 @ 20.00 | | | | | |
| 19.99 | Order D: 2000 @ 19.99 | | | | | |

The NBB price is now 20.01. Away Market A is alone at the NBB.

As Order E is a Tracking Liquidity Order, its current executable price is evaluated whenever the NBB changes. In this example, Order E is automatically repriced at $20.01, the new NBB, as the NBB price is not higher than Order E's MaxPrice of $20.01. As Tracking Liquidity Orders are completely hidden from the marketplace, the posting market center 20 Best Bid does not change. The internal book looks like this:

| Price point | Display | Reserve | Liquidity | Discretion | Tracking | Routing |
|---|---|---|---|---|---|---|
| 20.01 | | | | Order D: 2000 @ 20.01 | Order E: 1000 @ 20.01, MaxPrice = 20.01 | Market A: 3000 @ 20.01 |
| 20.00 | Order A: 1000 @ 20.00 | Order B: 7500 @ 20.00 | Order C: 9000 @ 20.00 | Order D: 2000 @ 20.00 | | |
| | Order B: 500 @ 20.00 | | | | | |
| 19.99 | Order D: 2000 @ 19.99 | | | | | |

An incoming order to Sell 2600@20.01 would:

Look for orders priced at $20.01 in the Display Process level first, finding none;

Look for orders priced at $20.01 in the Reserve Process level next, finding none;

Look for orders priced at $20.01 in the Liquidity Process level next, finding none;

Trade all the orders that can step up to $20.01 in the Discretionary Process level next (2000 shares of Order D); and Trade 600 shares of Order E at $20.01 in the Tracking Process, as Order E has sufficient size (1000 shares) to intercept the remaining 600 shares of the incoming Sell order. The remaining 400 shares of Order E are canceled immediately as a Tracking Liquidity Order by definition can only execute once.

At the conclusion of the trades, Discretionary Order D and Tracking Liquidity Order E would be completely depleted and removed from the internal book.

Example: Ranking of Tracking Liquidity Orders in the Tracking Process

As previously stated, Tracking Liquidity Orders are ranked in strict price/time priority within the Tracking Process. All Tracking Liquidity Orders are ranked according to their current executable prices, not their specified limit ceiling/floor prices. Tracking Liquidity Buy Orders are ranked according to the lower of the current NBB price and their specified MaxPrice. Similarly, Tracking Liquidity Sell Orders are ranked according to the higher of the current NBO price and their specified MinPrice.

In this example, the NBBO is $19.99 to $20.02 when the following Tracking Liquidity Orders are received in this sequence:

Order A: Buy 400@19.99

Order B: Buy 500@20.01

Order C: Buy 300@20.00

Order D: Buy 600@20.01

Order E: Buy 200@20.00

The order matching engine 21 evaluates each incoming order and assigns its current executable price. As the NBB is presently $19.99 in this example, and the specified limit price of each of the five received orders is greater than or equal to the NBB price, the order matching engine 21 assigns the current executable price ("CurrentBuyPrice") of $19.99 to each order and stores it in price/time priority in the Tracking Process in the sequence shown below:

| Price point | Tracking Order Details | MaxPrice |
|---|---|---|
| 19.99 | Order A: Buy 400 @ 19.99 | 19.99 |
| | Order B: Buy 500 @ 19.99 | 20.01 |
| | Order C: Buy 300 @ 19.99 | 20.00 |
| | Order D: Buy 600 @ 19.99 | 20.01 |
| | Order E: Buy 200 @ 19.99 | 20.00 |

The NBB changes to 20.00.

The order matching engine 21 retrieves the best order, Order A. It compares the MaxPrice of Order A ($19.99) to the NBB ($20.00), and determines that Order A must remain priced at $19.99, the lower of its MaxPrice and the NBB.

The order matching engine 21 retrieves the next best order, Order B. It compares the MaxPrice of Order B ($20.01) to the NBB ($20.00), and determines that Order B must be repriced at $20.00, the lower of its MaxPrice and the NBB. Order B is now the best order. The internal book looks like this:

| Price point | Tracking Order Details | MaxPrice |
|---|---|---|
| 20.00 | Order B: Buy 500 @ 20.00 | 20.01 |
| 19.99 | Order A: Buy 400 @ 19.99 | 19.99 |
| | Order C: Buy 300 @ 19.99 | 20.00 |
| | Order D: Buy 600 @ 19.99 | 20.01 |
| | Order E: Buy 200 @ 19.99 | 20.00 |

The order matching engine 21 retrieves the next best order, Order C. It compares the MaxPrice of Order C ($20.00) to the NBB ($20.00), and determines that Order C must be repriced at $20.00, as its MaxPrice and the NBB are equal. Order C is inserted in price/time priority behind Order B. The internal book looks like this:

| Price point | Tracking Order Details | MaxPrice |
|---|---|---|
| 20.00 | Order B: Buy 500 @ 20.00 | 20.01 |
| | Order C: Buy 300 @ 20.00 | 20.00 |
| 19.99 | Order A: Buy 400 @ 19.99 | 19.99 |
| | Order D: Buy 600 @ 19.99 | 20.01 |
| | Order E: Buy 200 @ 19.99 | 20.00 |

The order matching engine 21 retrieves the next best order, Order D. It compares the MaxPrice of Order D ($20.01) to the NBB ($20.00), and determines that Order D must be repriced at $20.00, the lower of its MaxPrice and the NBB. Order D is inserted in price/time priority behind Order C. The internal book looks like this:

| Price point | Tracking Order Details | MaxPrice |
|---|---|---|
| 20.00 | Order B: Buy 500 @ 20.00 | 20.01 |
| | Order C: Buy 300 @ 20.00 | 20.00 |
| | Order D: Buy 600 @ 20.00 | 20.01 |
| 19.99 | Order A: Buy 400 @ 19.99 | 19.99 |
| | Order E: Buy 200 @ 19.99 | 20.00 |

The order matching engine 21 retrieves the last order, Order E. It compares the MaxPrice of Order E ($20.00) to the NBB ($20.00), and determines that Order E must be repriced at $20.00, as its MaxPrice and the NBB are equal. Order E is inserted in price/time priority behind Order D. The internal book looks like this:

| Price point | Tracking Order Details | MaxPrice |
|---|---|---|
| 20.00 | Order B: Buy 500 @ 20.00 | 20.01 |
| | Order C: Buy 300 @ 20.00 | 20.00 |
| | Order D: Buy 600 @ 20.00 | 20.01 |
| | Order E: Buy 200 @ 20.00 | 20.00 |
| 19.99 | Order A: Buy 400 @ 19.99 | 19.99 |

The NBB changes to $20.01.

The order matching engine 21 retrieves its best order, Order B. It compares the MaxPrice of Order E ($20.01) to the NBB ($20.01), and determines that Order B must be repriced at $20.01, as its MaxPrice and the NBB are equal. Order B is inserted in the internal book according to its new price of $20.01. The internal book looks like this:

| Price point | Tracking Order Details | MaxPrice |
|---|---|---|
| 20.01 | Order B: Buy 500 @ 20.01 | 20.01 |
| 20.00 | Order C: Buy 300 @ 20.00 | 20.00 |
| | Order D: Buy 600 @ 20.00 | 20.01 |
| | Order E: Buy 200 @ 20.00 | 20.00 |
| 19.99 | Order A: Buy 400 @ 19.99 | 19.99 |

The order matching engine 21 retrieves its next-best order, Order C. It compares the MaxPrice of Order C ($20.00) to the NBB ($20.01), and determines that Order C must remain at its current executable price of $20.00, the lower of its MaxPrice and the NBB.

The order matching engine 21 retrieves its next-best order, Order D. It compares the MaxPrice of Order D ($20.01) to the NBB ($20.01), and determines that Order D must be repriced at $20.01, as its MaxPrice and the NBB are equal. Order D is inserted in the internal book behind Order B. The internal book looks like this:

| Price point | Tracking Order Details | MaxPrice |
|---|---|---|
| 20.01 | Order B: Buy 500 @ 20.01 | 20.01 |
| | Order D: Buy 600 @ 20.01 | 20.01 |
| 20.00 | Order C: Buy 300 @ 20.00 | 20.00 |
| | Order E: Buy 200 @ 20.00 | 20.00 |
| 19.99 | Order A: Buy 400 @ 19.99 | 19.99 |

The order matching engine 21 retrieves its next-best order, Order E. It compares the MaxPrice of Order E ($20.00) to the NBB ($20.01), and determines that Order E must remain at its current executable price of $20.00, the lower of its MaxPrice and the NBB.

The order matching engine 21 retrieves its last order, Order A. It compares the MaxPrice of Order A ($19.99) to the NBB ($20.01), and determines that Order A must remain at its current executable price of $19.99, the lower of its MaxPrice and the NBB.

The NBB changes to $20.00.

The order matching engine 21 retrieves its best order, Order B. As the current executable price of Order B ($20.01) is higher than the NBB ($20.00), the order must be repriced less aggressively, at the NBB. Order B is inserted in the internal book behind Orders C and E, which have time priority at the price of $20.00. The internal book looks like this:

| Price point | Tracking Order Details | MaxPrice |
|---|---|---|
| 20.01 | Order D: Buy 600 @ 20.01 | 20.01 |
| 20.00 | Order C: Buy 300 @ 20.00 | 20.00 |
|  | Order E: Buy 200 @ 20.00 | 20.00 |
|  | Order B: Buy 500 @ 20.00 | 20.01 |
| 19.99 | Order A: Buy 400 @ 19.99 | 19.99 |

The order matching engine 21 retrieves its next-best order, Order D. As the current executable price of Order D ($20.01) is higher than the NBB ($20.00), the order must be repriced less aggressively, at the NBB. Order D is inserted in the internal book behind Order B. The internal book looks like this:

| Price point | Tracking Order Details | MaxPrice |
|---|---|---|
| 20.00 | Order C: Buy 300 @ 20.00 | 20.00 |
|  | Order E: Buy 200 @ 20.00 | 20.00 |
|  | Order B: Buy 500 @ 20.00 | 20.01 |
|  | Order D: Buy 600 @ 20.00 | 20.01 |
| 19.99 | Order A: Buy 400 @ 19.99 | 19.99 |

The order matching engine 21 retrieves its next-best order, Order C. As the current executable price of Order C ($20.00) is equal to the NBB ($20.00), the order does not need to be repriced, and retains its current ranking in the internal book. As Order C does not need to be repriced lower, then the order matching engine 21 does not need to reevaluate the price of the remaining orders (Orders E and A) as those orders are ranked lower in the internal book than Order C and therefore will not need to be repriced either.

Example: Tracking Liquidity Order Size Trumps Time Priority

As illustrated in the previous examples, Tracking Liquidity Buy Orders are ranked according to their current executable price (CurrentBuyPrice), not according to their maximum pegging price (MaxPrice). However, although the orders are ranked in price/time priority at their CurrentBuyPrice, an order's size will trump another order's time if the higher-ranked order does not have sufficient size to fully intercept an incoming order and prevent any part of it from routing.

In this example, the NBB is 20.00 and the orders are ranked as in the previous example:

| Price point | Order Details | MaxPrice |
|---|---|---|
| 20.00 | Order C: Buy 300 | 20.00 |
|  | Order E: Buy 200 | 20.00 |
|  | Order B: Buy 500 | 20.01 |
|  | Order D: Buy 600 | 20.01 |
| 19.99 | Order A: Buy 400 | 19.99 |

The posting market center 20 receives the following order:
Sell 450@20.00

The order matching engine 21 determines that the incoming Sell order is marketable. It retrieves the best order, Order C. It compares the size of Order C (300 shares) to the size of the incoming order (450 shares). As the size of the incoming order exceeds the size of Order C, the orders cannot match according to the rules for Tracking Liquidity Orders.

The order matching engine 21 retrieves its next best order, Order E. It compares the size of Order E (200 shares) to the size of the incoming order (450 shares). As the size of the incoming order exceeds the size of Order E, Order E cannot match either.

The order matching engine 21 retrieves its next best order, Order B. It compares the size of Order B (500 shares) to the size of the incoming order (450 shares). As the size of the incoming order is less than the size of Order B, Order B can fully intercept it. The order matching engine 21 executes 450 shares of the incoming Sell order with Order B, completely filling the incoming Sell order. It cancels the remaining 50 shares of Order B. The internal book looks like this after Order B is removed:

| Price point | Order Details | MaxPrice |
|---|---|---|
| 20.00 | Order C: Buy 300 | 20.00 |
|  | Order E: Buy 200 | 20.00 |
|  | Order D: Buy 600 | 20.01 |
| 19.99 | Order A: Buy 400 | 19.99 |

As illustrated in this example, Tracking Liquidity Orders cannot be aggregated to intercept an incoming order. Instead, the order matching engine retrieves the highest-ranked order with sufficient size to fully execute the incoming order. The size requirement trumps the time priority of the resting Tracking Liquidity Orders. Although Order C and Order E had time priority over Order B, Order B was allowed to step ahead of those orders due to its ability to meet the size requirement, which is a fundamental prerequisite for the execution of any Tracking Liquidity Order.

Example: Tracking Liquidity Orders in a Locked or Crossed Market

In this implementation of the invention, resting Tracking Liquidity Orders continue to peg to the NBBO even if the NBBO should become locked or crossed. This is true regardless of whether the posting market center 20 participates in the lock/cross or not. Additionally, in this implementation of the invention, Tracking Liquidity Orders are accepted and activated even if the NBBO is already locked or crossed when the order is received. If the NBBO is locked or crossed when an incoming order is about to route, a Tracking Liquidity Order that can intercept the incoming order will execute at the locked or crossed price.

In this example, Market Center A is alone at the NBBO with 200@$20.00 to 300@$20.02. The internal book looks like this:

| Bids | Offers |
|---|---|
| Market A: 200 @ 20.00 | Market A: 300 @ 20.02 |
| Market B: 500 @ 19.98 | Market B: 200 @ 20.03 |

The posting market center 20 receives the following orders:
Order A: Buy 300@20.02, Tracking Liquidity
Order B: Sell 400@19.99, Tracking Liquidity
The order matching engine 21 prices Order A at the current NBB, $20.00. It prices Order B at the current NBO, $20.02. For illustration purposes, in the examples below, the Tracking Liquidity Orders are shown in "reverse-display" to indicate their status as nondisplayed orders. As resident trading interest has priority over away market interest at the same price, the orders are shown ranked ahead of Away Market A.

The internal book looks like this:

| Bids | Offers |
|---|---|
| Order A: 300 @ 20.00 | Order B: 400 @ 20.02 |
| MaxPrice = 20.02 | MinPrice = 19.99 |
| Market A: 200 @ 20.00 | Market A: 300 @ 20.02 |
| Market B: 500 @ 19.98 | Market B: 200 @ 20.03 |

As Tracking Liquidity Orders are not displayed to the marketplace, the NBBO remains unchanged.

Market Center B changes its offer to 200@19.99, crossing Market Center A. The NBBO is now crossed ($20.00 to $19.99).

The order matching engine detects the updated NBO of $19.99. It retrieves Order B, determines that Order B's specified minimum limit price allows it to be priced down to $19.99, and reprices Order B at the updated NBO price of $19.99, following Market Center B into the cross.

The internal book looks like this:

| Bids | Offers |
|---|---|
| Order A: 300 @ 20.00 | Order B: 400 @ 19.99 ← |
| MaxPrice = 20.02 | MinPrice = 19.99 |
| Market A: 200 @ 20.00 | Market B: 200 @ 19.99 ← |
| Market B: 500 @ 19.98 | Market A: 300 @ 20.02 |

As the NBBO is now crossed, Order A and Order B are also crossed. However, by definition, Tracking Liquidity Orders can only execute against incoming orders that are about to route off the posting market center 20. As neither Order A nor Order B can route, the orders cannot execute against each other, even though their prices overlap. Thus, it is permissible for both orders to remain active in the internal book even though their prices are presently crossed.

The posting market center 20 receives the following order:

Order C: Buy 200@Market

As Market Orders are eligible for routing, and Tracking Liquidity Sell Order B's size (400 shares) exceeds incoming Buy Order C's size (200 shares), the order matching engine 21 matches Order B with Order C at the price of $19.99, the NBO. It cancels the remaining 200 shares of Order B after the match because Tracking Liquidity Orders can only execute once.

Example: Ranking of Tracking Liquidity Orders in the Directed Order Process

This example illustrates the priority of a Tracking Liquidity Order compared to a Market Maker's Directed Fill in an equities trading environment. In this example, a Market Maker 31a has a standing instruction with the posting market center 20 that the order matching engine 21 automatically generate a Directed Fill in response to a marketable Directed Order received from a permissioned user. For the purposes of this example, a Directed Fill has a size and price specified by the Market Maker.

For this example, the internal book contains the following orders when the NBBO is $20.01 to $20.03:

Order A: Buy 1000@20.00
Order B: Buy 8000@20.00, Show Size=500, Reserve Size=7500
Order C: Buy 1000@20.02, Tracking Liquidity Order The current executable price of Order C is $20.01, the NBB price. The internal book looks like this:

| Price point | Display | Reserve | Liquidity | Discretion | Tracking |
|---|---|---|---|---|---|
| 20.02 | | | | | |
| 20.01 | | | | | Order C: 1000 @ 20.01, MaxPrice = 20.02 |
| 20.00 | Order A: 1000 @ 20.00 Order B: 500 @ 20.00 | Order B: 7500 @ 20.00 | | | |

In this example, the following valid Directed Order is received by the posting market center 20 from a user who is permissioned to direct orders to Market Maker MM1:

Sell 1000@20.01, directed to Market Maker MM1

In this example, the Market Maker MM1 has a standing instruction with the posting market center 20 to buy 2000 at $20.01. In this example, the order matching engine 21, upon receiving the Directed Order for Market Maker MM1, automatically generates a Directed Fill priced at $20.01, a penny better than the posting market center Best Bid ($20.00) and also a penny better than the NBB ($20.00).

Although Tracking Liquidity Order C can also trade at $20.01 and was resting in the internal book before the Directed Fill was automatically generated, the incoming order matches with the Directed Fill generated on behalf of the Market Maker in the Directed Order Process. This is because the Directed Order Process has a higher priority for execution than the Tracking Process. Directed Fills always have priority over Tracking Liquidity Orders at the same price, without regard to time priority.

In a different implementation of the Directed Order Process, the posting market center 20 may allow registered Market Makers to create a virtual book of "Guarantee Orders" instead of using standing instructions to dynamically generate Directed Fills. In such an implementation of the Directed Order Process, if Market Maker MM1 had a Guarantee Order to Buy 1000 at $20.01 in its virtual book, the results would be essentially the same as described above. An incoming Directed Order to Sell 1000 at $20.01 with Market Maker MM1 would match the Guarantee Order, not the Tracking Liquidity Order, because the Directed Order Process executes first.

As illustrated in these examples, a Directed Order is executed against the Directed Fill or the Virtual Guarantee Order of the designated Market Maker ahead of a resting Tracking Liquidity Order at the same price.

Example: Ranking of a Tracking Liquidity Order Compared to Market Maker Quotes in the Lead Market Maker Guarantee Process This example illustrates the priority of a Tracking Liquidity Order compared to Market Maker Quotes 33 in an options trading environment. In this example, Market Makers 31 may send quotes only for issues in which they are assigned. In this example, the internal book contains the following orders when the NBBO is $2.00 to $2.10:

Order A: Buy 100@1.95
Order B: Buy 800@1.95, Show Size=50, Reserve Size=750
Order C: Buy 100@2.05, Tracking Liquidity
The internal book looks like this:

| Price point | Display | Reserve | Liquidity | Discretion | Tracking |
|---|---|---|---|---|---|
| 2.05 | | | | | |
| 2.00 | | | | | Order C: 100 @ 2.00, MaxPrice = 2.05 |
| 1.95 | Order A: 100 @ 1.95 Order B: 50 @ 1.95 | Order B: 750 @ 1.95 | | | |

In this example, the Market Maker Quote Book 33 includes the following bids, where LMM 31a is the Lead Market Maker, and MM2 and MM3 are regular Market Makers. All three bids were received after the orders were already stored in the internal book. In this example, the quotes are prioritized according to their timestamps in the sequence shown below:

| Market Maker ID | Bids |
|---|---|
| MM2 | Bid 200 @ 2.00 |
| LMM | Bid 300 @ 2.00 |
| MM3 | Bid 300 @ 2.00 |

The NBBO in this example is 2.00 to 2.10 (800×800). The posting market center 20 receives the following order:
Sell 500@2.00

Tracking Liquidity Order C has the same current executable price ($2.00) as the three Market Maker bids ($2.00), and also has time priority. However, as Lead Market Maker LMM is quoting at the NBB ($2.00), LMM is eligible to trade in the Lead Market Maker Guarantee Process. LMM is entitled to step ahead of MM2 to trade up to a specified guaranteed percentage (e.g., 40% in this example). LMM is also entitled to trade ahead of Tracking Liquidity Order C as only displayed orders with time priority are eligible for execution in the Lead Market Maker Guarantee Process, and Order C is not displayed. When the order matching engine 21 determines that a quote is marketable, it automatically generates an order on behalf of that quote. The incoming sell order matches 200 contracts (40% of 500 contracts) against LMM at $2.00 in this example. The internal book remains unchanged.

The Market Maker Quote Book now looks like this:

| Market Maker ID | Bids |
|---|---|
| MM2 | Bid 200 @ 2.00 |
| LMM | Bid 100 @ 2.00 |
| MM3 | Bid 300 @ 2.00 |

After the incoming order trades in the Lead Market Maker Guarantee Process, its remaining 300 contracts trade according to normal price/time priority rules in the Display Process:
200 contracts match Market Maker MM2's quote@2.00, as MM2 has time priority over LMM and MM3; and
100 contracts match Market Maker LMM's quote@2.00, as LMM has time priority over MM3

As the incoming order is completely matched in the Display Process, no portion of the incoming order is available to execute with Order C in the Tracking Process. Orders in the Tracking Process cannot execute until all orders and quotes at the same price have executed first in the Lead Market Maker Guarantee Process, the Display Process, the Reserve Process, the Liquidity Process, and the Discretionary Process. The Tracking Process has the lowest execution priority except for the Routing Process.

Example: Ranking of Passive Liquidity Order Compared to Market Maker Quotes in the Directed Order Process In this example, in an options trading environment, a Market Maker who is not the Lead Market Maker is granted the same privileges for guaranteed participation according to the rules of the Directed Order Process. In this example, the internal book looks as it did at the beginning in the Lead Market Maker Guarantee Process example above, and the NBBO is still $2.00 to $2.10:

| Price point | Display | Reserve | Liquidity | Discretion. | Tracking |
|---|---|---|---|---|---|
| 2.05 | | | | | |
| 2.00 | | | | | Order C: 100 @ 2.00, MaxPrice = 2.05 |
| 1.95 | Order A: 100 @ 1.95 Order B: 50 @ 1.95 | Order B: 750 @ 1.95 | | | • |

The Market Maker Quote Book includes the same following bids, where LMM is the Lead Market Maker and MM2 and MM3 are regular Market Makers. All three bids were received after the orders were already stored in the internal order book. In this example also, the quotes are prioritized according to their timestamps as follows:

| Market Maker ID | Bids |
|---|---|
| MM2 | Bid 200 @ 2.00 |
| LMM | Bid 300 @ 2.00 |
| MM3 | Bid 300 @ 2.00 |

The NBBO is $2.00 to $2.10 (800×800). In this example, the Directed Order Process is operable on the posting market center 20. An order sending firm 26b is permissioned to direct orders to the Market Maker firm MM3 31b, and sends the following Directed Order to the posting market center 20:
Sell 500@2.00, directed to Market Maker MM3

Tracking Liquidity Order C has the same current executable price ($2.00) as the three Market Maker bids ($2.00), and also has time priority. However, as designated Market Maker MM3 is quoting at the NBB ($2.00), MM3 is eligible to trade in the Directed Order Process. MM3 is entitled to step ahead of MM2 and LMM to trade up to a specified guaranteed percentage (e.g., 40% in this example). MM3 is also entitled to trade ahead of Tracking Liquidity Order C as the Directed Order Process has execution priority over the Tracking Process. The incoming sell order matches 200 contracts (40% of 500 contracts) against MM3 at $2.00 in this example. The internal book remains unchanged.

The Market Maker Quote Book now looks like this:

| Market Maker ID | Bids |
| --- | --- |
| MM2 | Bid 200 @ 2.00 |
| LMM | Bid 300 @ 2.00 |
| MM3 | Bid 100 @ 2.00 |

After the incoming order trades in the Directed Order Process, its remaining 300 contracts trade in the Display Process according to normal price/time priority rules:

200 contracts match Market Maker MM2's quote@2.00; and 100 contracts match Market Maker LMM's quote@2.00

As illustrated in the preceding examples, in this embodiment of the invention, a Market Maker quoting at the NBBO always trades ahead of a Tracking Liquidity Order at the same price. A Market Maker quote at the NBBO may execute in the Lead Market Maker Guarantee Process, the Directed Order Process, and/or the regular Display Process. All these processes have priority over the Tracking Process. A Tracking Liquidity Order will execute ahead of a Market Maker quote only if the Tracking Liquidity Order's current execution price is at the NBBO and the Market Maker's quote is inferior to the NBBO.

It should be noted that the preceding examples are only by way of explanation in regard to the priority of Tracking Liquidity Orders in comparison to Market Maker quotes, Directed Fills, Guarantee Orders, or their functional equivalents. The Directed Order Process and/or the Lead Market Maker Guarantee Process may be implemented in a manner that differs from what is described in these examples, without altering the fundamental principle that a Market Maker quote (or its functional counterpart) always executes ahead of a Tracking Liquidity Order at the same price.

Incoming Tracking Liquidity Buy Order is Received

Figure 2:
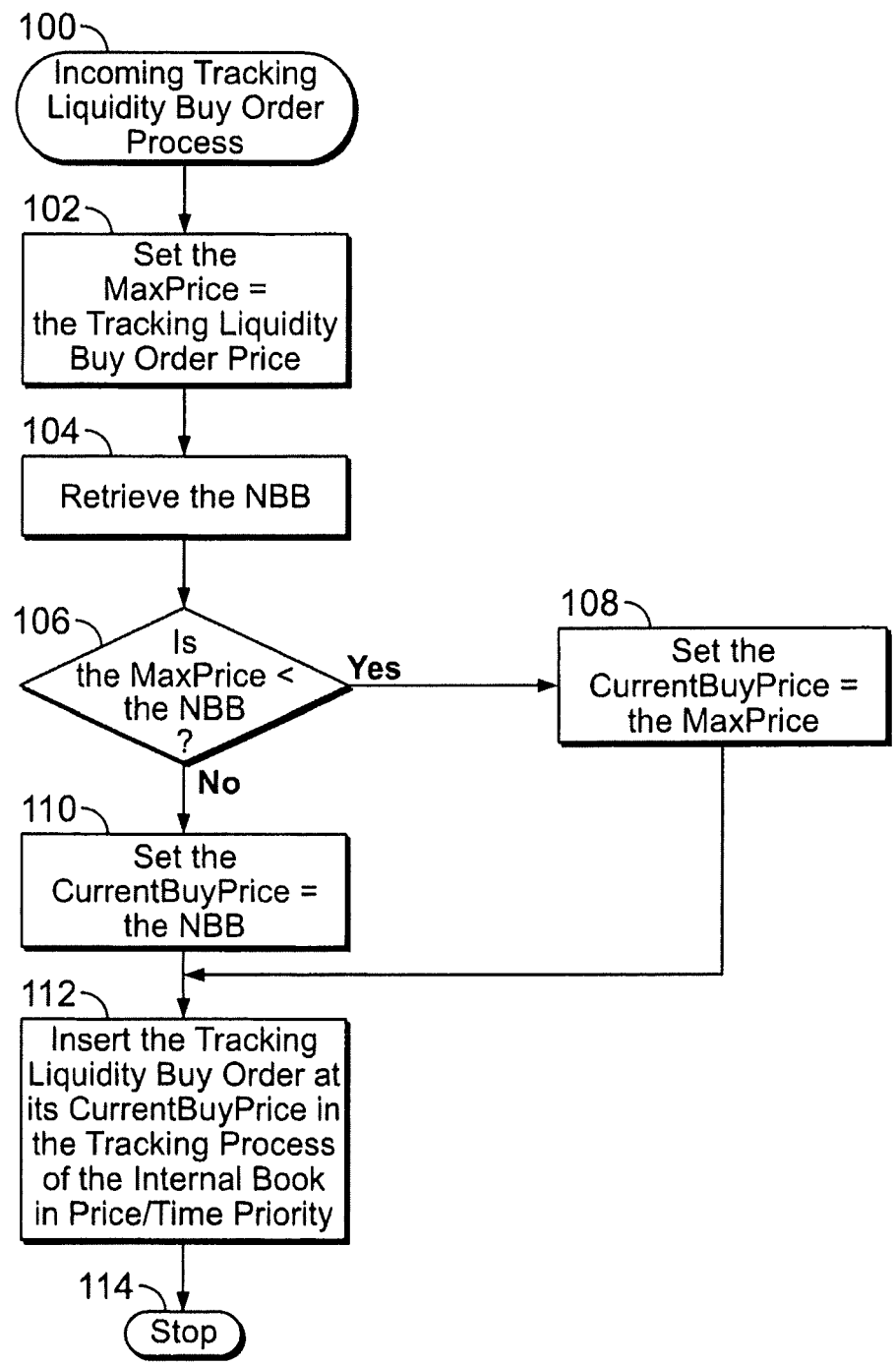
FIG. 2 is a flow diagram illustrating a process implemented by an embodiment of the present invention for processing an incoming tracking liquidity buy order.

FIG. 2 illustrates the process implemented by the order matching engine 21 when a trader at an order sending firm 26 sends a Tracking Liquidity Buy Order to the posting market center 20. At step 100, a new Tracking Liquidity Order is received by the order matching engine 21. The process first stores the limit price specified by the trader ("MaxPrice") on the incoming Tracking Liquidity Buy Order, as indicated at step 102. Although the current execution price of the Tracking Liquidity Buy Order will change during its lifetime, its price is capped by the specified "MaxPrice," which never changes. At step 104, the process retrieves the National Best Bid ("NBB"). At step 106, the process determines the price that should be presently assigned to the incoming Tracking Liquidity Buy Order. It does this by comparing the MaxPrice to the NBB. If the MaxPrice is less than the NBB, the process sets the current executable price ("CurrentBuyPrice") of the incoming Tracking Liquidity Buy Order equal to the MaxPrice, as indicated at step 108. On the other hand, if the MaxPrice is greater than or equal to the NBB, then the process sets the current executable price ("CurrentBuyPrice") of the incoming Tracking Liquidity Buy Order equal to the NBB, as indicated at step 110. Finally at step 112, the Tracking Liquidity Buy Order is inserted in the Tracking Process level of the internal book, in price/time priority, according to its CurrentBuyPrice, as indicated at step 112. It is important to note that the order is ranked according to its current executable price, and not according to its maximum executable price. The process is then complete as indicated at step 114.

Figure 3:
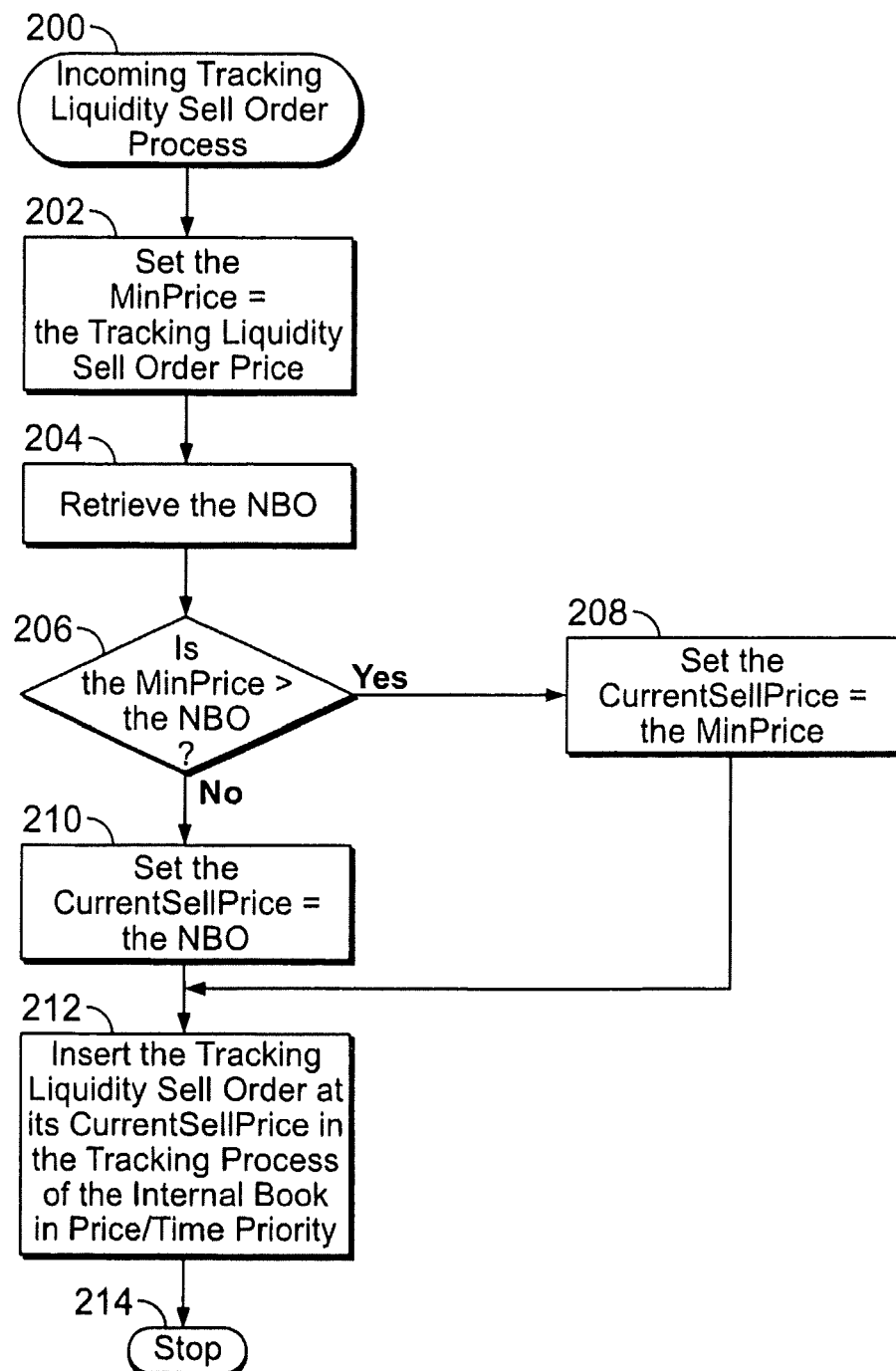
FIG. 3 is a flow diagram illustrating a process implemented by an embodiment of the present invention for processing an incoming tracking liquidity sell order.
Figure 4:
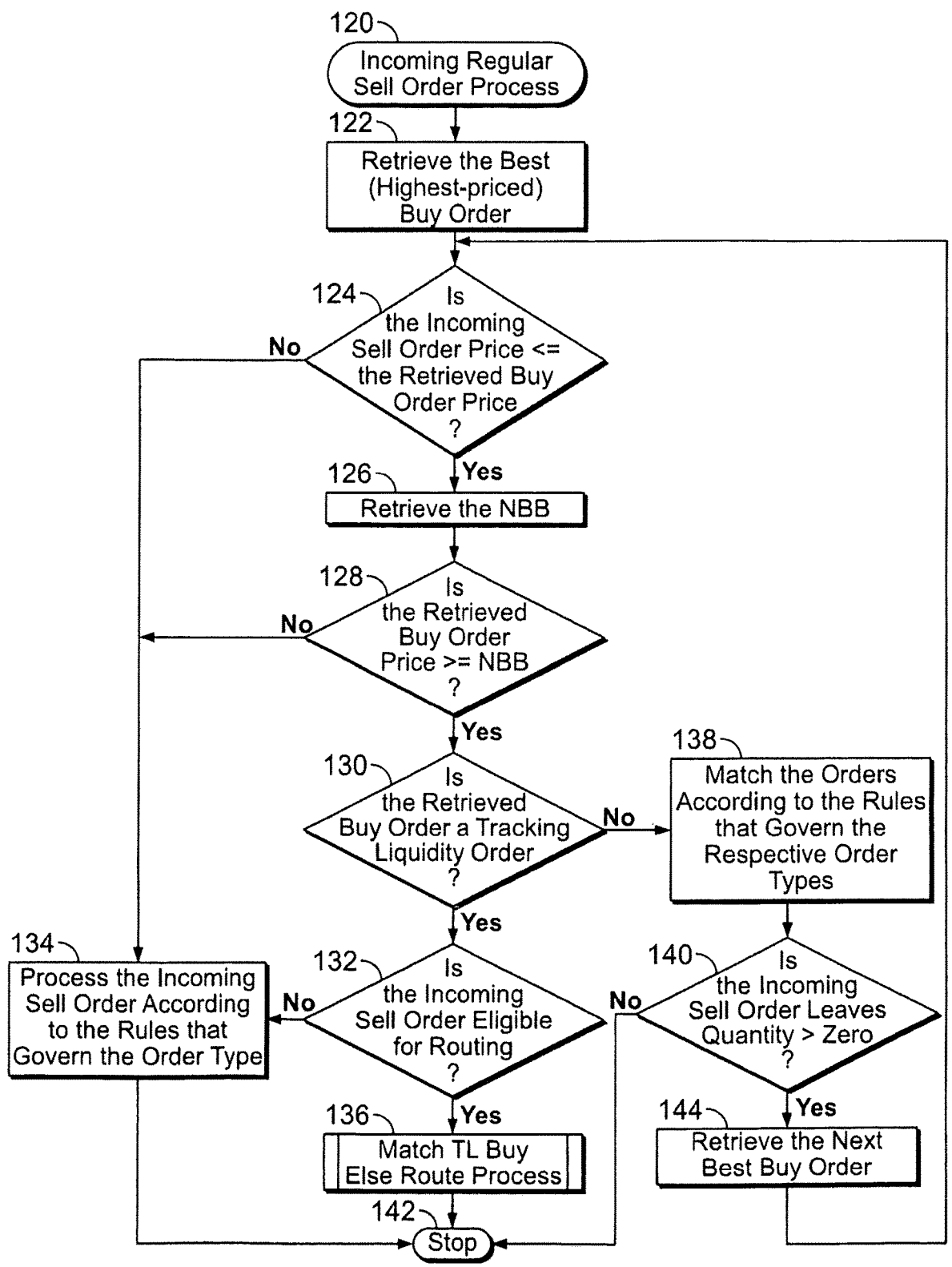
FIG. 4 is a flow diagram illustrating a process implemented by an embodiment of the present invention for tracking liquidity buy order interaction with an incoming sell order.

Incoming Sell Order May be Executable Against a Resting Tracking Liquidity Buy Order Referring to FIG. 4, an embodiment of the process for when the posting market center 20 receives an incoming 'regular' (i.e., non-Tracking Liquidity) Sell Order is illustrated (the process for an incoming Tracking Liquidity Sell Order is illustrated in FIG. 3 instead). At step 120, the posting market center 20 receives a regular incoming Sell Order. The order matching engine 21 process is activated.

At step 122, the process retrieves the best (highest-priced) Buy Order on the posting market center. The process then compares the price of the retrieved Buy Order to the price of the incoming Sell Order, as indicated at step 124. (In the case where the retrieved Buy Order is a Tracking Liquidity Order, then the price of the retrieved Buy Order that is evaluated is the Tracking Liquidity Order's CurrentBuyPrice, not its MaxPrice.) If the price of the incoming Sell Order is not less than or equal to the price of the retrieved Buy Order, the orders cannot match, so at step 134, the incoming Sell Order is processed according to the rules that govern the order type, e.g., it may be included in the internal book, routed to a superior away market, or canceled because it cannot be executed immediately. The process terminates at step 142.

Referring back to step 124, if the price of the incoming Sell Order is less than or equal to the retrieved Buy Order price, then the process proceeds to step 126, where it retrieves the NBB. At step 128, the process checks whether the retrieved Buy Order is at or better than the NBB. (In the case where the retrieved Buy Order is a Tracking Liquidity Order, the order is at the NBB if its CurrentBuyPrice is equal to the NBB.) At step 130, the process determines if the retrieved Buy Order is a Tracking Liquidity Order. If it is not, then the incoming Sell Order and the retrieved Buy Order are matched with one another according to the trading rules that govern their respective order types, as indicated at step 138. The process then checks to determine if the incoming Sell Order still has quantity remaining at step 140. If the incoming Sell Order does have quantity remaining, the process continues to step 144 to retrieve the next best Buy Order and returns to step 124 to repeat the process of determining whether the incoming Sell Order can execute with the next best retrieved Buy Order or not. On the other hand, if the incoming Sell Order has been completely filled, then the process stops as indicated at step 142.

Referring back to step 130, if the retrieved Buy Order is a Tracking Liquidity Order, then the process determines if the incoming order is an order type that is eligible for routing at step 132. If it is, then a Tracking Liquidity Buy Order could possibly trade against the incoming Sell Order and prevent it from routing. If the incoming Sell Order type is not routable, then a Tracking Liquidity Buy Order cannot trade against it, and the incoming Sell Order is processed according to the rules that govern the order type (e.g., it may be canceled, or it may be repriced less aggressively), as indicated at step 134, and the process terminates at step 142.

Referring back to step 132, if, however, the incoming Sell Order type is eligible to be routed, then the process proceeds to the "Match TL Buy Else Route" process, as indicated at step 136, and described in detail below, to determine whether the retrieved Tracking Liquidity Buy Order, or alternatively another Tracking Liquidity Buy Order at the same price, can trade against the incoming Sell Order, or if the incoming Sell Order must be routed to an away market instead. After the "Match TL Buy Else Route" process is complete, the process stops as indicated at step 142.

Figure 6:
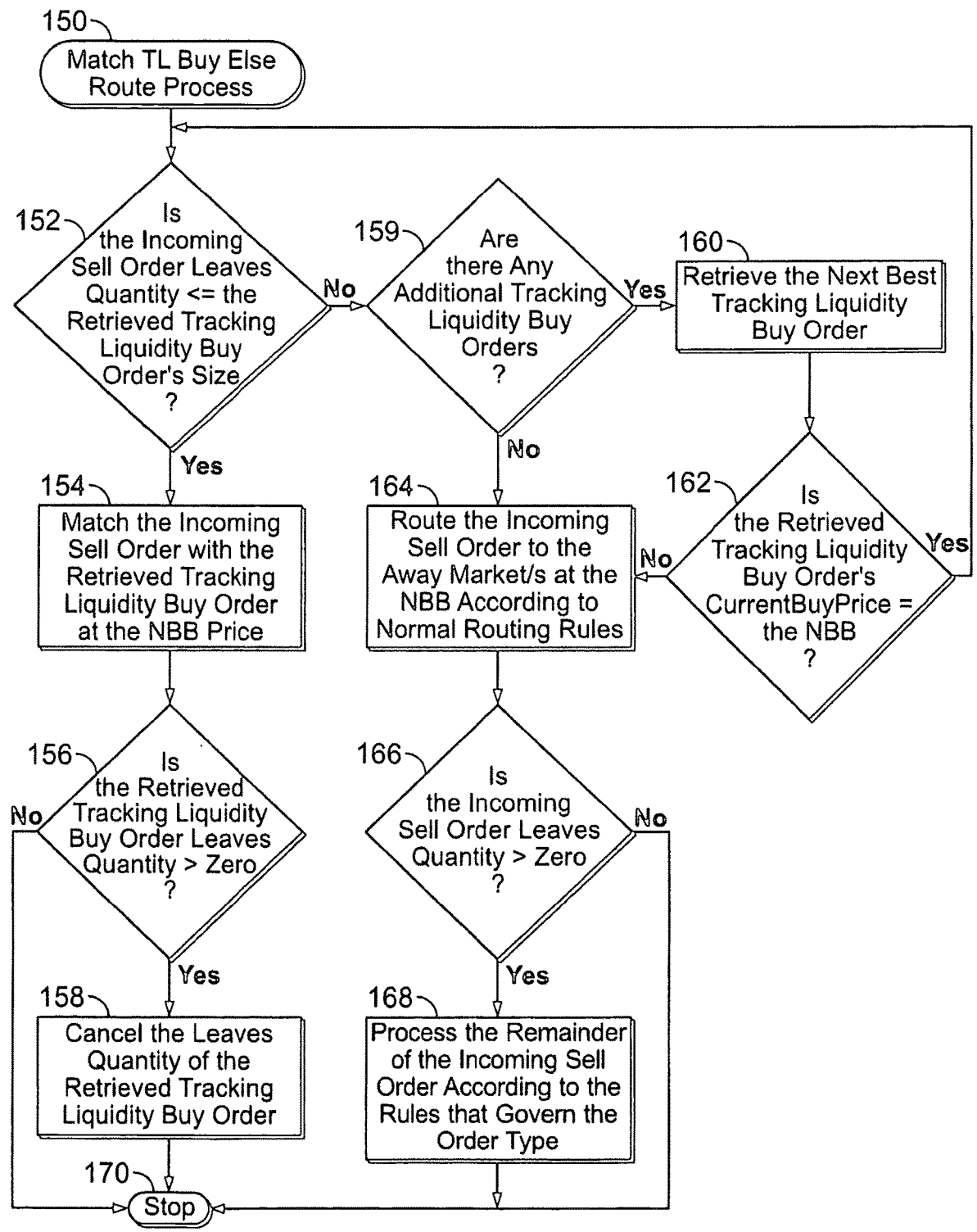
FIG. 6 is a flow diagram illustrating a process implemented by an embodiment of the present invention for determining whether to match an incoming sell order with a tracking liquidity buy order or to route the order.

Referring to FIG. 6, the "Match TL Buy Else Route" process referred to above is illustrated as the process is initiated at step 150. At step 152, the process compares the Leaves quantity of the incoming Sell Order (which is its full order size if it did not partially execute prior to this point) to the size of the retrieved Tracking Liquidity Buy Order. By definition, a Tracking Order can only execute against an incoming order whose size is equal or lower, as it must fully intercept the order to prevent even a single share or contract from routing. Therefore, if the retrieved Tracking Liquidity Buy Order has sufficient size to match the full Leaves quantity of the incoming Sell Order, then the orders match each other at step 154, and the trade is priced at the NBB. At step 156, the process determines whether the Tracking Liquidity Buy Order still has any remaining quantity after the match, and if it does, it cancels its remaining quantity at step 158. The reason for this is because a Tracking Liquidity Order can only match once according to the business rules for the order type. The process stops at step 170 after any remaining size is canceled if necessary.

Referring back to step 152, if the retrieved Tracking Liquidity Buy Order does not have sufficient size to match the full Leaves quantity of the incoming Sell Order, then the process continues to step 159, where it checks to see if any additional Tracking Liquidity Buy Orders exist. If additional Tracking Liquidity Buy Orders do exist, then the process continues to step 160, where it retrieves the next best Tracking Liquidity Buy Order. At step 162, the process checks to see if the next best Tracking Liquidity Buy Order is eligible to execute by evaluating its CurrentBuyPrice. As previously described, it is possible that a Tracking Liquidity Buy Order's price will be inferior to the NBB if it has already been capped at its specified limit price (MaxPrice). If the next best Tracking Liquidity Buy Order is priced at the NBB, then the process returns to step 152, where it checks to see if this retrieved Tracking Liquidity Buy Order has sufficient size to intercept the incoming Sell Order, even though the previous Tracking Liquidity Buy Order did not. If this Tracking Liquidity Buy Order does have sufficient size, then the orders match as described at step 154. However, if this Tracking Liquidity Buy Order does not have sufficient size either, then the process continues to step 159, where. it checks to see whether additional Tracking Liquidity Buy Orders exist. If additional Tracking Liquidity Buy Orders do exist, then the process continues to step 160, where it retrieves the next best Tracking Liquidity Buy Order.

The process continues in this fashion until it either retrieves a marketable Tracking Liquidity Buy Order with sufficient size, or else failing that and having evaluated each Tracking Liquidity Buy Order whose current execution price is at the NBB, must proceed to step 164. At step 164, the process routes the incoming Sell Order to one or more away markets at the NBB, according to the normal rules that govern the routing of the order type. After the incoming Sell Order has satisfied the away market/s at the NBB, if the process determines at step 166 that the order still has quantity remaining, it is processed at step 168 according to the rules that govern the order type, e.g., the remainder of the incoming Sell order might be posted to the book or else might continue to wait for an updated NBB. After the incoming Sell Order has completed, the process terminates at step 170.

Repricing Tracking Liquidity Buy Orders when the NBB Changes

Figure 8:
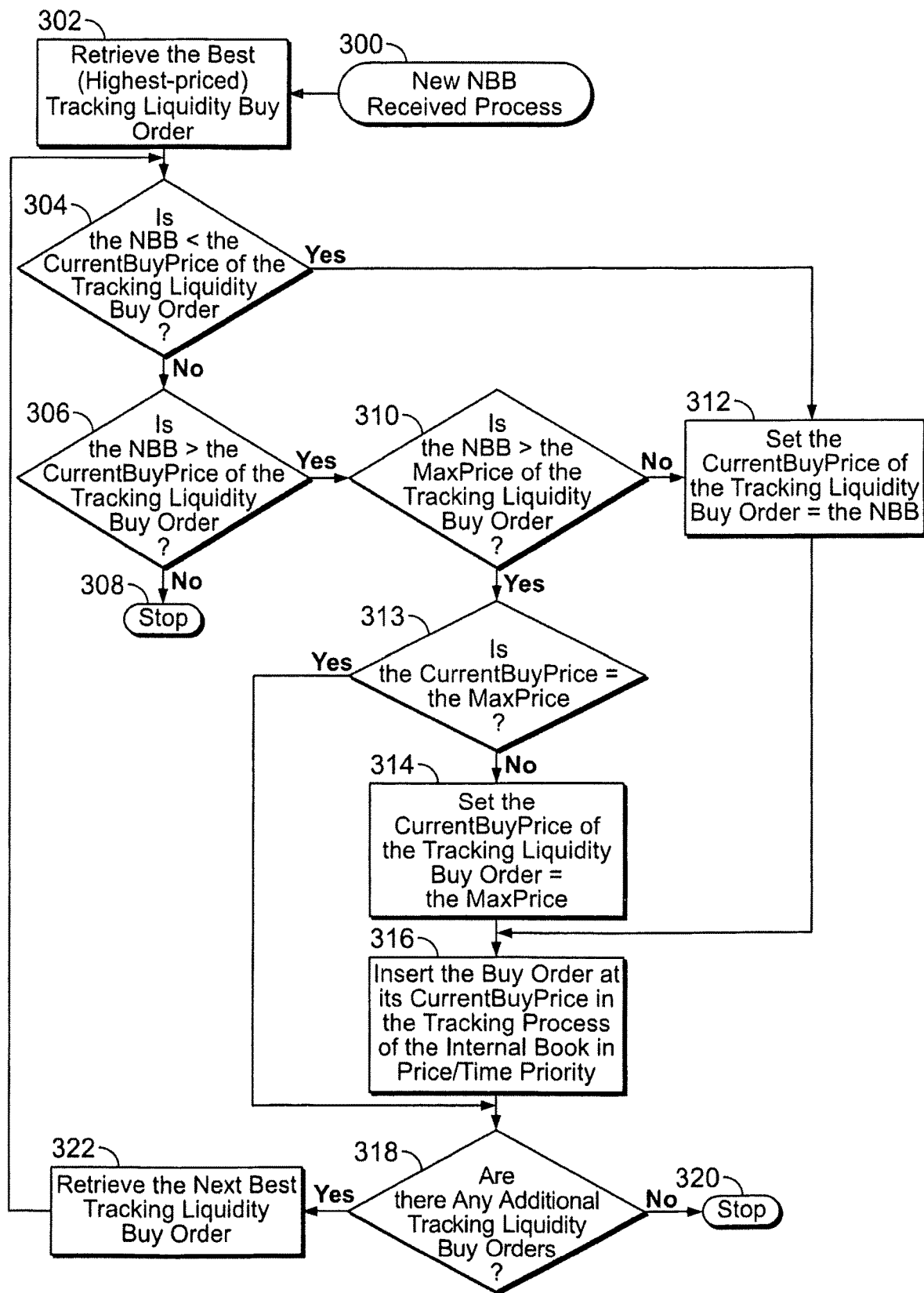
FIG. 8 is a flow diagram illustrating a process implemented by an embodiment of the present invention to determine if a tracking liquidity buy order should be re-priced.

Referring to FIG. 8, when the process receives or determines a new NBB price at step 300, it checks to see if any Tracking Liquidity Buy Orders must be repriced. As explained and illustrated earlier in this document, the internal book can contain a multiplicity of Tracking Liquidity Buy Orders with different executable prices, as some Buy orders have already been capped at their specified "MaxPrice" value and are no longer at the NBB. While only Tracking Liquidity Buy Orders priced at the NBB are eligible for trading, all Tracking Liquidity Buy Orders may need to be reevaluated for possible repricing when the NBB changes. If the new NBB is the same as a Tracking Liquidity Buy Order's current executable price, then no repricing is necessary and the order remains at its current price. However, if the new NBB price is lower than a Tracking Liquidity Buy Order's current executable price, then the order must always be repriced lower (i.e., less aggressively) at the new NBB. Similarly, if the new NBB price is higher than a Tracking Liquidity Buy Order's current executable price, then the order can potentially be priced higher (i.e., more aggressively), but only up to the lesser of its MaxPrice and the new NBB price.

At step 302, the process retrieves the highest-priced Tracking Liquidity Buy Order, and at step 304, the process then compares the price of the retrieved Tracking Liquidity Buy Order to the new NBB price. If the new NBB is less than the current executable price ("CurrentBuyPrice") of the retrieved Tracking Liquidity Buy Order, then the retrieved order must be repriced less aggressively. To this end, the process sets the value of the CurrentBuyPrice of the Tracking Liquidity Buy Order equal to the new NBB, as indicated at step 312. If, on the other hand, at step 304, the new NBB is not less than the value of the CurrentBuyPrice of the retrieved Tracking Liquidity Buy Order, then the process continues to step 306, where it checks to see if the new NBB is greater than the CurrentBuyPrice of the retrieved Tracking Liquidity Buy Order. If the NBB is not greater than the CurrentBuyPrice, this means the prices are equal, and the order does not need to be repriced. In this case, the process stops at step 308, because if this retrieved Tracking Liquidity Buy Order does not need to be repriced, then other lower-ranking Tracking Liquidity Buy Orders will not need to be repriced either.

Returning to step 306, if on the other hand, the NBB is indeed greater than the retrieved Tracking Liquidity Buy Order's CurrentBuyPrice, then the retrieved order may potentially be repriced more aggressively. To determine how aggressively it can be repriced, the process must determine which price is lower, the MaxPrice or the NBB price, and must choose the lower of the two prices. To this end, at step 310 it compares the NBB to the MaxPrice value. If the NBB is not greater than the retrieved order's MaxPrice value, then the process proceeds to step 312 where it sets the value of the CurrentBuyPrice of the Tracking Liquidity Buy Order equal to the NBB price. If, on the other hand, the process determines at step 310 that the NBB is greater than the MaxPrice value, then the process continues to step 313, where it checks if the order is already priced as high as it can be, i.e., if the CurrentBuyPrice is equal to the MaxPrice value. If the order is not yet priced at its MaxPrice, then the process sets the CurrentBuyPrice of the Tracking Liquidity Order equal to the MaxPrice value as indicated at step 314.

After repricing the CurrentBuyPrice of the retrieved Tracking Liquidity Buy Order, the process continues to step 316, where it inserts the Tracking Liquidity Buy Order in the Tracking Process level of the internal book according to the price/time priority of its new CurrentBuyPrice value. If, on the other hand, the Tracking Liquidity Buy Order's CurrentBuyPrice did not change because it was already at its MaxPrice, as determined at step 313, then the order does not need to be re-ranked in the internal book. The process continues to step 318, where it checks to see whether any additional Tracking Liquidity Buy Orders exist. If no additional orders exist, then the process is completed at step 320 as shown. If, on the other hand, additional orders do exist, then the process retrieves the next best Tracking Liquidity Buy Order at step 322, and returns to step 304 and repeats the process described above to determine if this next order should also be repriced. The process continues in this fashion until all Tracking Liquidity Buy Orders that require repricing are completed.

Incoming Tracking Liquidity Sell Order is Received

FIG. 3 illustrates the process implemented by the order matching engine 21 when a trader at an order sending firm 26 sends a Tracking Liquidity Sell Order to the posting market center 20. At step 200, a new Tracking Liquidity Order is received by the order matching engine 21. The process first stores the limit price specified by the trader ("MinPrice") on the incoming Tracking Liquidity Sell Order, as indicated at step 202. Although the current execution price of the Tracking Liquidity Sell Order will change during its lifetime, its price is capped by the specified "MinPrice," which never changes. At step 204, the process retrieves the National Best Offer ("NBO"). At step 206, the process determines the price that should be presently assigned to the incoming Tracking Liquidity Sell Order. It does this by comparing the MinPrice to the NBO. If the MinPrice is greater than the NBO, the process sets the current price ("CurrentSellPrice") of the incoming Tracking Liquidity Sell Order equal to the MinPrice, as indicated at step 208. On the other hand, if the MinPrice is less than or equal to the NBO, then the process sets the current price ("CurrentSellPrice") of the incoming Tracking Liquidity Sell Order equal to the NBO, as indicated at step 210. Finally at step 212, the Tracking Liquidity Sell Order is inserted in the Tracking Process level of the internal book, in price/time priority, according to its CurrentSellPrice, as indicated at step 212. Note that the order is ranked according to its current executable price, and not according to its minimum executable price. The process is then complete as indicated at step 214.

Figure 5:
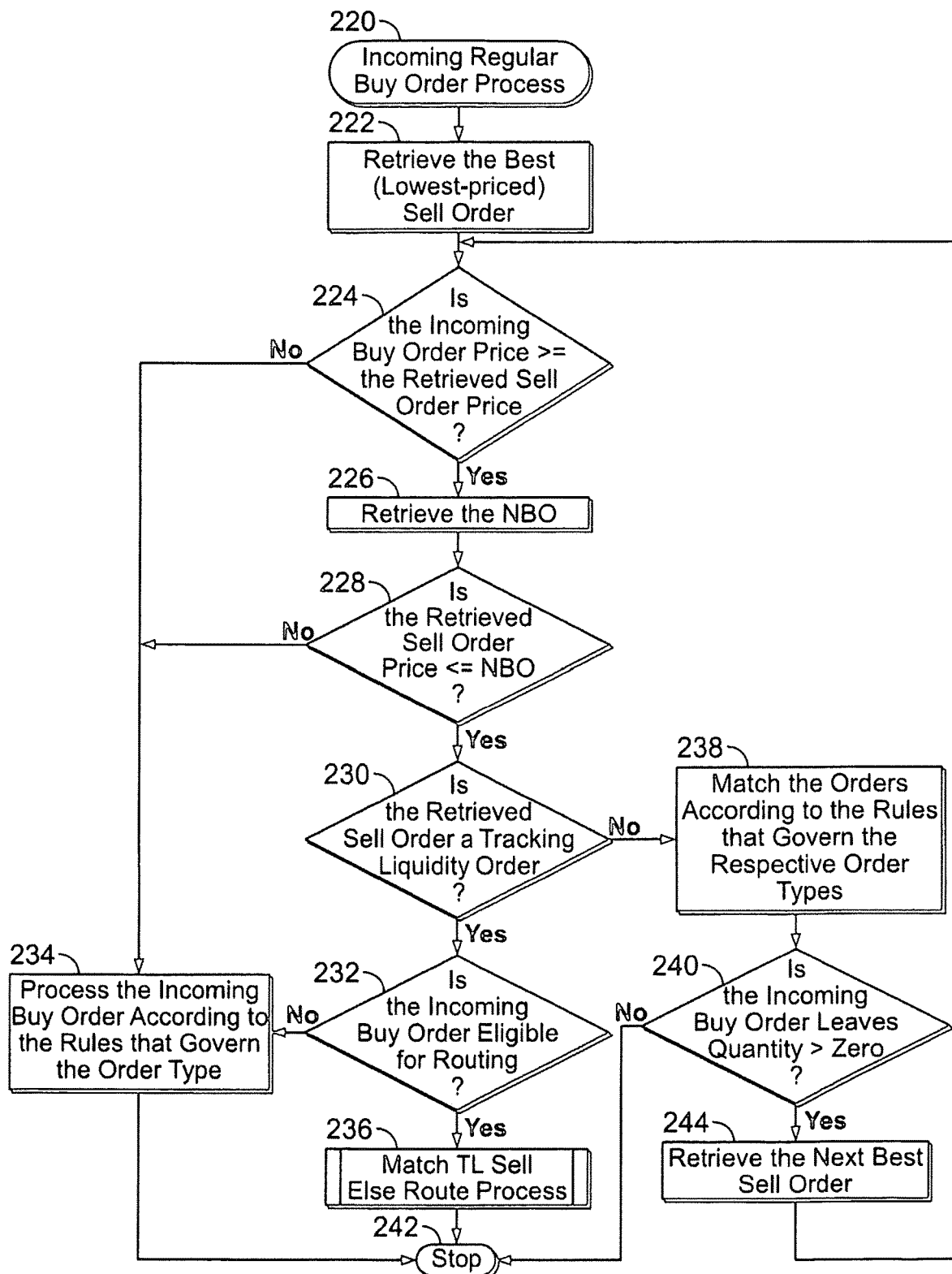
FIG. 5 is a flow diagram illustrating a process implemented by an embodiment of the present invention for tracking liquidity sell order interaction with an incoming buy order.

Incoming Buy Order May be Executable Against a Resting Tracking Liquidity Sell Order Referring to FIG. 5, an embodiment of the process for when the posting market center 20 receives an incoming 'regular' (i.e., non-Tracking Liquidity) Buy Order is illustrated (the process for an incoming Tracking Liquidity Buy Order is illustrated in FIG. 2 instead). At step 220, the posting market center 20 receives a regular incoming Buy Order. The order matching engine 21 process is activated.

At step 222, the process retrieves the best (lowest-priced) Sell Order on the posting market center. The process then compares the price of the retrieved Sell Order to the price of the incoming Buy Order, as indicated at step 224. (In the case where the retrieved Sell Order is a Tracking Liquidity Order, then price of the retrieved Sell Order that is evaluated is the Tracking Liquidity Order's CurrentSellPrice, not its MinPrice.) If the price of the incoming Buy Order is not greater than or equal to the price of the retrieved Sell Order, then the orders cannot match, and at step 234, the incoming Buy Order is processed according to the rules that govern the order type, e.g., it may be included in the internal book, routed to a superior away market, or canceled because it cannot be executed immediately. The process terminates at step 242.

Referring back to step 224, if the price of the incoming Buy Order is greater than or equal to the retrieved Sell Order price, then the process proceeds to step 226, where it retrieves the NBO. At step 228, the process checks whether the retrieved Sell Order is at or better than the NBO. (In the case where the retrieved Sell Order is a Tracking Liquidity Order, the order is at the NBO if its CurrentSellPrice is equal to the NBO.) At step 230, the process determines if the retrieved Sell Order is a Tracking Liquidity Order. If it is not, then the incoming Buy Order and the retrieved Sell Order are matched with one another according to the trading rules that govern their respective order types, as indicated at step 238. The process then checks to determine if the incoming Buy Order still has quantity remaining at step 240. If the incoming Buy Order does have quantity remaining, the process continues to step 244 to retrieve the next best Sell Order and returns to step 224 to repeat the process of determining whether the incoming Buy Order can execute with the next best retrieved Sell Order or not. On the other hand, if the incoming Buy Order has been completely filled, then the process stops as indicated at step 242.

Referring back to step 230, if the retrieved Sell Order is a Tracking Liquidity Order, then the process determines if the incoming order is an order type that is eligible for routing at step 232. If it is, then a Tracking Liquidity Sell Order could possibly trade against the incoming Buy Order and prevent it from routing. If the incoming Buy Order type is not routable, then Tracking Liquidity Sell Orders cannot trade against it, and the incoming Buy Order is processed according to the rules that govern the order type (e.g., it may be canceled, or it may be repriced less aggressively), as indicated at step 234, and the process terminates at step 242.

Referring back to step 232, if, however, the incoming Buy Order type is eligible to be routed, then the process proceeds to the "Match TL Sell Else Route" process, as indicated at step 236, and described in detail below, to determine whether the retrieved Tracking Liquidity Sell Order, or another Tracking Liquidity Sell Order at the same price, can trade against the incoming Buy Order, or if the incoming Buy Order must be routed to an away market instead. After the "Match TL Sell Else Route" process is complete, the process stops as indicated at step 242.

Figure 7:
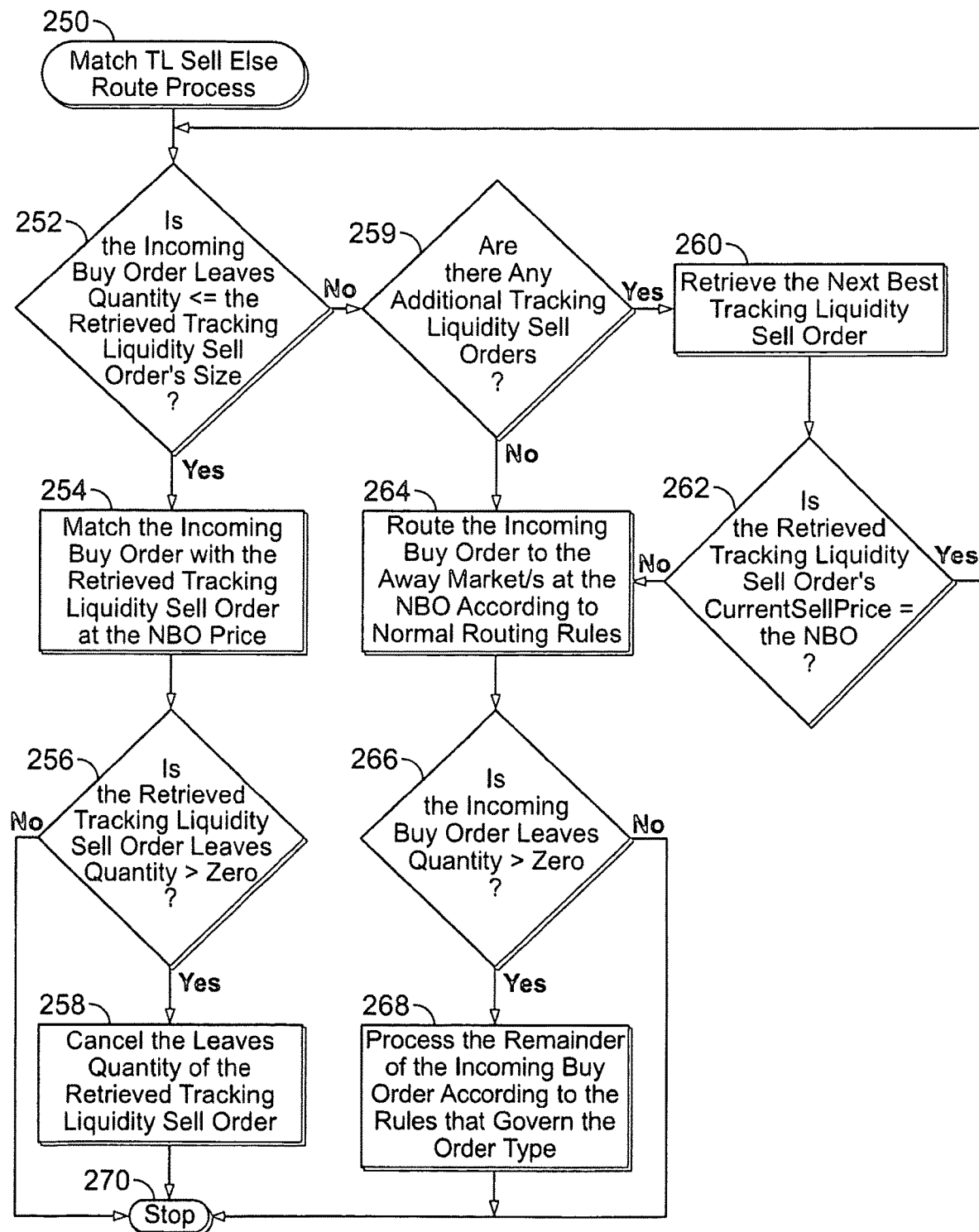
FIG. 7 is a flow diagram illustrating a process implemented by an embodiment of the present invention for determining whether to match an incoming buy order with a tracking liquidity sell order or to route the order.

Referring to FIG. 7, the "Match TL Sell Else Route" process referred to above is illustrated as the process is initiated at step 250. At step 252, the process compares the Leaves quantity of the incoming Buy Order (which is its full order size if it did not partially execute prior to this point) to the size of the retrieved Tracking Liquidity Sell Order. By definition, a Tracking Order can only execute against an incoming order whose size is equal or lower, as it must fully intercept the order to prevent even a single share or contract from routing. Therefore, if the retrieved Tracking Liquidity Sell Order has sufficient size to match the full Leaves quantity of the incoming Buy Order, then the orders match each other at step 254, and the trade is priced at the NBO. At step 256, the process determines whether the Tracking Liquidity Sell Order still has any remaining quantity after the match, and if it does, it cancels its remaining quantity at step 258. The reason for this is because a Tracking Liquidity Order can only match once. The process stops at step 270 after any remaining size is canceled if necessary.

Referring back to step 252, if the retrieved Tracking Liquidity Sell Order does not have sufficient size to match the full Leaves quantity of the incoming Buy Order, then the process continues to step 259, where it checks to see if any additional Tracking Liquidity Sell Orders exist. If additional Tracking Liquidity Sell Orders do exist, then the process continues to step 260, where it retrieves the next best Tracking Liquidity Sell Order. At step 262, the process checks to see if the if the next best Tracking Liquidity Sell Order is eligible to execute by evaluating its CurrentSellPrice. As previously described, it is possible that a Tracking Liquidity Sell Order's price will be inferior to the NBO if it has already been capped at its specified limit price (MinPrice). If the next best Tracking Liquidity Sell Order is priced at the NBO, then the process returns to step 252, where it checks to see if this retrieved Tracking Liquidity Sell Order has sufficient size to intercept the incoming Buy Order, even though the previous Tracking Liquidity Sell Order did not. If this retrieved Tracking Liquidity Sell Order does have sufficient size, then the orders match, as described above, at step 254. However, if this retrieved Tracking Liquidity Sell Order does not have sufficient size either, then the process continues to step 259, where it checks to see whether additional Tracking Liquidity Sell Orders exist. If additional Tracking Liquidity Sell Orders do exist, then the process continues to step 260, where it retrieves the next best Tracking Liquidity Sell Order.

The process continues in this fashion until it either retrieves a marketable Tracking Liquidity Sell Order with sufficient size, or else failing that and having evaluated each Tracking Liquidity Sell Order whose current execution price is at the NBO, must proceed to step 264. At step 264, the process routes the incoming Buy Order to one or more away markets at the NBO, according to the normal rules that govern the routing of the order type. After the incoming Buy Order has satisfied the away market/s at the NBO, if the process determines at step 266 that the order still has quantity remaining, it is processed at step 268 according to the rules that govern the order type, e.g., the remainder of the incoming Buy order might be posted to the book or else might continue to wait for an updated NBO. After the incoming Buy Order has completed, the process terminates at step 270.

Repricing Tracking Liquidity Sell Orders when the NBO Changes

Figure 9:
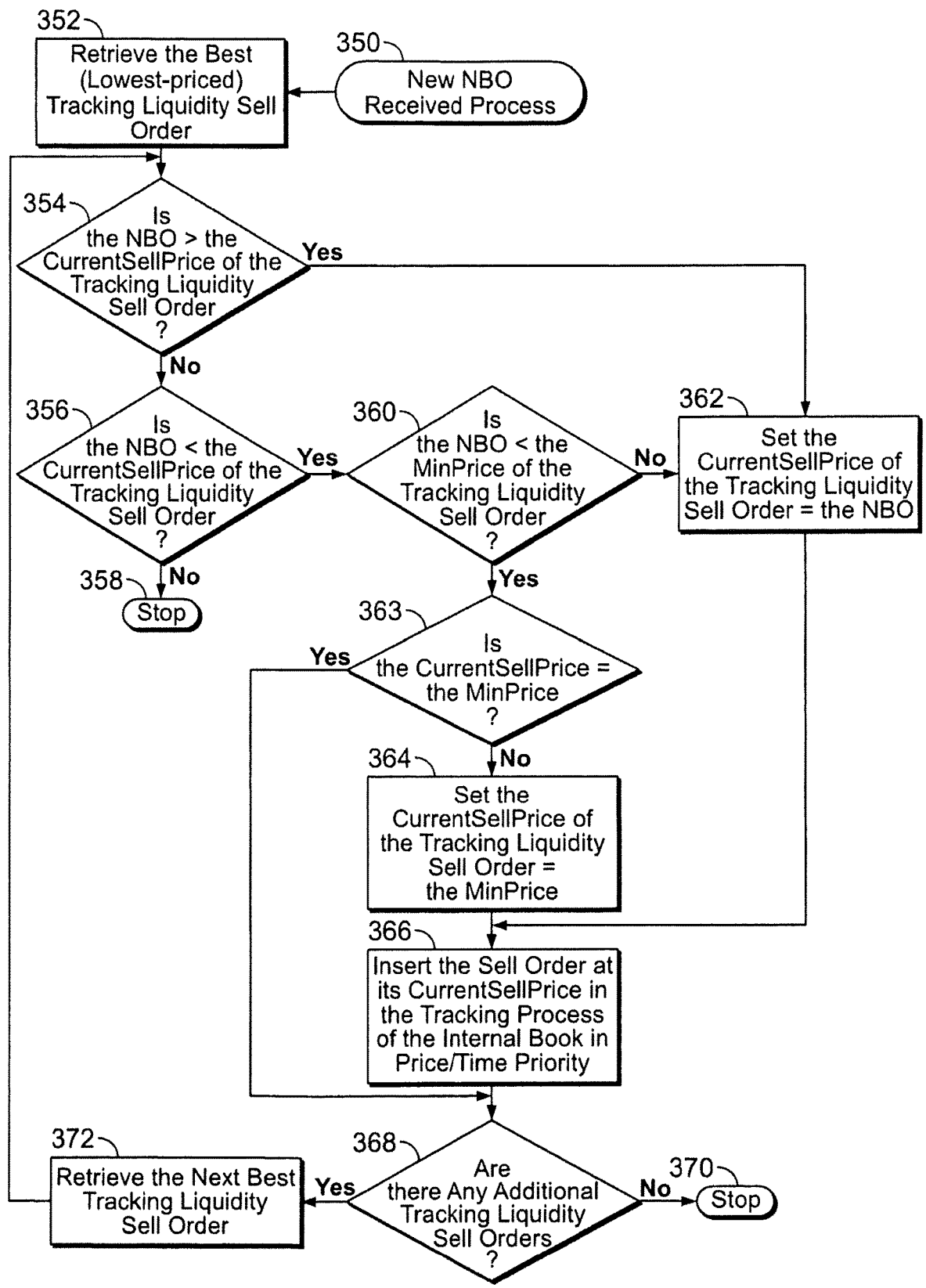
FIG. 9 is a flow diagram illustrating a process implemented by an embodiment of the present invention to determine if a tracking liquidity sell order should be re-priced.

Referring to FIG. 9, when the process receives or determines a new NBO at step 350, it checks to see if any Tracking Liquidity Sell Orders must be repriced. As explained and illustrated earlier in this document, the internal book can contain a multiplicity of Tracking Liquidity Orders with different executable prices, as some Sell orders have already been capped at their specified "MinPrice" value and are no longer at the NBO. While only Tracking Liquidity Sell Orders priced at the NBO are eligible for trading, all Tracking Liquidity Sell Orders may need to be reevaluated for possible repricing when the NBO changes. If the new NBO is the same as a Tracking Liquidity Sell Order's current executable price, then no repricing is necessary and the order remains at its current price. However, if the new NBO price is higher than a Tracking Liquidity Sell Order's current executable price, then the order must always be repriced higher (i.e., less aggressively) at the new NBO. Similarly, if the new NBO price is lower than a Tracking Liquidity Sell Order's current executable price, then the order can potentially be priced lower (i.e., more aggressively), but only down to the greater of its MinPrice and the new NBO price.

At step 352, the process retrieves the lowest-priced Tracking Liquidity Sell Order, and at step 354, the process then compares the price of the retrieved Tracking Liquidity Sell Order to the new NBO price. If the new NBO is greater than the current executable price ("CurrentSellPrice") of the retrieved Tracking Liquidity Sell Order, then the retrieved order must be repriced less aggressively. To this end, the process sets the value of the CurrentSellPrice of the Tracking Liquidity Sell Order to the new NBO, as indicated at step 362. If, on the other hand, at step 354, the new NBO is not greater than the value of the CurrentSellPrice of the retrieved Tracking Liquidity Sell Order, then the process continues to step 356, where it checks to see if the new NBO is less than the CurrentSellPrice of the retrieved Tracking Liquidity Sell Order. If the NBO is not less than the CurrentSellPrice, this means the prices are equal, and the order does not need to be repriced. In this case, the process stops at step 358, because if this retrieved Tracking Liquidity Sell Order does not need to be repriced, then other lower-ranking Tracking Liquidity Sell Orders will not need to be repriced either.

Returning to step 356, if on the other hand, the NBO is indeed lower than the retrieved Tracking Liquidity Sell Order's CurrentSellPrice, then the retrieved order may potentially be repriced more aggressively. To determine how aggressively it can be repriced, the process must determine which price is higher, the MinPrice or the NBO price, and must choose the higher of the two prices. To this end, at step 360 it compares the NBO to the MinPrice value. If the NBO is not lower than the retrieved order's MinPrice value, then the process proceeds to step 362 where it sets the value of the CurrentSellPrice of the Tracking Liquidity Sell Order equal to the NBO price. If, on the other hand, the process determines at step 360 that the NBO is lower than the MinPrice value, then the process continues to step 363, where it checks if the order is already priced as low as it can be, i.e., if the CurrentSellPrice is equal to the MinPrice value. If the order is not yet priced at its MinPrice, then the process sets the CurrentSellPrice of the Tracking Liquidity Order equal to the MinPrice value as indicated at step 364.

After repricing the CurrentSellPrice of the retrieved Tracking Liquidity Sell Order, the process continues to step 366, where it inserts the Tracking Liquidity Sell Order in the Tracking Process level of the internal book according to the price/time priority of its new CurrentSellPrice value. If, on the other hand, the Tracking Liquidity Sell Order's CurrentSellPrice did not change because it was already at its MinPrice, as determined at step 363, then the order does not need to be re-ranked in the internal book. The process continues to step 368, where it checks to see whether any additional Tracking Liquidity Sell Orders exist. If no additional orders exist, then the process is completed at step 370 as shown. If, on the other hand, additional orders do exist, then the process retrieves the next best Tracking Liquidity Sell Order at step 372, and returns to step 354 and repeats the process described above to determine if this next order should also be repriced. The process continues in this fashion until all Tracking Liquidity Sell Orders that require repricing are completed.

Examples of how Tracking Liquidity Orders of this embodiment operate are provided below. It should be understood that the order and quote prices and sizes discussed in these examples are by way of example only to illustrate how the process of an embodiment of the invention handles Tracking Liquidity Orders. Tracking liquidity order behavior is not limited to these examples. For illustration purposes, in the examples below, the Tracking Liquidity Orders are shown in "reverse-display" to indicate their status as nondisplayed orders.

Example 1: Incoming Tracking Liquidity Buy Order is Posted

In this example, the NBBO is $20.00 to $20.03 and an away market, Market Center A, is quoting $20.00 to $20.03. The following buy orders are posted in the internal book:

Order 1: Buy 8000@20.00, Show size=500, Reserve size=7500

Order 2: Buy 1000@20.00

Order 3: Buy 300@19.99

Order 4: Sell 600@20.04

The internal order book looks like this:

| Bids | Offers |
|---|---|
| Order 1: 500 @ 20.00<br>Show size = 500, Reserve size = 7500 | Market A: 400 @ 20.03 |
| Order 2: 1000 @ 20.00 | Order 4: 600 @ 20.04 |
| Market A: 700 @ 20.00 | |
| Order 3: 300 @ 19.99 | |

The public order book, which only shows disclosed shares, looks like this:

| Bids | Offers |
|---|---|
| Posting Market Center<br>1500 @ 20.00 | Posting Market Center<br>600 @ 20.04 |
| Posting Market Center<br>300 @ 19.99 | |

The posting market center 20 receives the following order:

Order 5: Buy 400@20.02, Tracking Liquidity

The process is activated and, referring to FIG. 2, at step 102, the process stores the specified limit price on incoming Tracking Liquidity Buy Order 5 ($20.02) as the value of its "MaxPrice," the highest price to which Buy Order 5 will follow the NBB. The process continues to step 104, where it retrieves the NBB ($20.00). The process compares the MaxPrice of Buy Order 5 ($20.02) to the NBB ($20.00) at step 106. In this case, the MaxPrice is higher than the NBB, so the process sets the current executable price of the Tracking Liquidity Buy Order (i.e. the "CurrentBuyPrice" parameter) to the NBB price ($20.00) at step 110. The process inserts Tracking Liquidity Buy Order 5 into the Tracking Process sublevel of the internal book at step 112, where it is ranked according to the price/time priority of its CurrentBuyPrice ($20.00). At the price of $20.00, Order 1 and Order 2 both have priority over Tracking Liquidity Buy Order 5, i.e., Tracking Liquidity Order 5 is ranked last among the orders that can trade at $20.00. The process is completed at step 114 as indicated.

The internal book looks like this:

| Bids | Offers |
|---|---|
| Order 1: 500 @ 20.00<br>Show size = 500, Reserve size = 7500 | Market A: 400 @ 20.03 |
| Order 2: 1000 @ 20.00 | Order 4: 600 @ 20.04 |
| Order 5: 400 @ 20.00,<br>MaxPrice = 20.02 Tracking Process | |
| Market A: 700 @ 20.00 | |
| Order 3: 300 @ 19.99 | |

As Tracking Liquidity Orders are not displayed, the public order book remains unchanged and still looks like this:

| Bids | Offers |
|---|---|
| Posting Market Center<br>1500 @ 20.00 | Posting Market Center<br>600 @ 20.04 |
| Posting Market Center<br>300 @ 19.99 | |

Example 2: Tracking Liquidity Buy Order Cannot Intercept Incoming Sell Order

The posting market center 20 receives the following order:

Order 6: Sell 9500@20.00

At step 122 in FIG. 4, the process retrieves the highest-priced resting buy order, which is Buy Order 1 in this example. The process compares the price of incoming Sell Order 6 with retrieved Buy Order 1, at step 124, and determines their prices are equal. As the prices are equal, the process retrieves the NBB ($20.00) at step 126, and compares the price of retrieved Buy Order 1 ($20.00) to the NBB at step 128. As the prices are equal and the orders are eligible to match, the process checks to see if retrieved Buy Order 1 is a Tracking Liquidity Order at step 130. In this example, Buy Order 1 is not a Tracking Liquidity Order, so the process matches the 500 disclosed shares (i.e. the Show size) of Order 1 in the Display process according to the normal rules for matching Reserve Orders, as indicated at step 138.

The process, then, at step 140, determines that incoming Sell Order 6 still has 9000 shares available to trade, so it retrieves the next best buy order, which is Order 2, at step 144. The process then returns to step 124, where it compares the price of incoming Sell Order 6 ($20.00) with retrieved Buy Order 2 ($20.00) at step 124. Again, as the prices are equal, the process retrieves the NBB (still $20.00) at step 126 and determines that Buy Order 2 is at the NBB at step 128. The process then checks to see if retrieved Buy Order 2 is a Tracking Liquidity Order at step 130. In this example, Buy Order 2 is not a Tracking Liquidity Order, so the process matches the 1000 shares of Order 2 in the Display process according to normal limit-price matching rules, as indicated at step 138. Order 2 is completely depleted, and is removed from the internal book.

The process determines that incoming Sell Order 6 still has 8000 shares available to trade at step 140. As there are no more disclosed orders to buy at $20.00 in the Display process, it moves to the Working process and retrieves Buy Order 1's 7500 reserve shares at $20.00, at step 144. As before, the process compares the price of incoming Sell Order 6 with retrieved Buy Order 1 at step 124. As the prices are again equal, the process retrieves the NBB (still $20.00) at step 126 and determines that Buy Order 1 is at the NBB at step 128. At step 130, the process checks whether Buy Order 1 is a Tracking Liquidity Order. As noted before, Buy Order 1 is not a Tracking Liquidity Order, so the process matches the 7500 reserve shares of Order 1 in the Working process according to normal rules for matching Reserve Orders, again as indicated at step 138. Buy Order 1 is completely depleted, and is removed from the internal book.

The process then determines that incoming Sell Order 6 still has 500 shares available to trade at step 140. As there are no additional shares at $20.00 in the Working Process, at step 144, the process moves to the Tracking Process and retrieves Buy Order 5. The process, as before, returns to step 124 and compares the price of incoming Sell Order 6 ($20.00) with retrieved Buy Order 5. As Buy Order 5 is a Tracking Liquidity Order, its price ($20.00) is the value stored as its CurrentBuyPrice. The prices in this example are equal as well. The process retrieves the NBB (still $20.00) at step 126, and determines that retrieved Buy Order 5 is at the NBB at step 128. The process then checks to see if retrieved Buy Order 5 is a Tracking Liquidity Order in step 130. In this example, Buy Order 5 is a Tracking Liquidity Order, which means that it can only execute with order types that are eligible to be routed off the posting market center 20. At step 132, the process determines that incoming Sell Order 6, as a regular limit-priced order, is eligible to route, and is therefore eligible to match Buy Order 5 according to the rules for the order types. However, it can match Tracking Liquidity Buy Order 5 only if it complies with the 'size prevents routing' rule-namely that the number of remaining shares of the incoming order needs to be less than or equal to the number of shares available to trade in the Tracking Liquidity Order to prevent routing. The process invokes the routine to determine if the incoming order can be fully intercepted, as indicated at step 136.

Referring to FIG. 6, the process compares the size of Tracking Liquidity Buy Order 5 (400 shares) to the remaining shares of incoming Sell Order 6 (500 shares) at step 152. As the Leaves quantity of incoming Sell Order 6 exceeds the size of Tracking Liquidity Buy Order 5 in this example, Order 5 is not large enough to prevent Order 6 from routing. As a result, the process determines that Tracking Liquidity Buy Order 5 cannot trade, and the process bypasses Tracking Liquidity Buy Order 5 and continues to step 159, where it checks to see if there are any additional Tracking Liquidity Buy Orders that could possibly interact with incoming Sell Order 6 instead. As none exist, the process looks for away market bids whose prices overlap with incoming Sell Order 6, as indicated at step 164, and finds Market A's bid at $20.00. As such, the process routes the remaining 500 shares of incoming Sell Order 6 to Market A. Market A fills the 500 shares and decreases its bid size. At step 166, the process determines that incoming Sell Order 6 has no remaining shares available, and processing is complete, as indicated at step 170.

The internal book looks like this:

| Bids | Offers |
| --- | --- |
| Order 5: 400 @ 20.00. MaxPrice = 20.02 Tracking Process | Market A: 400 @ 20.03 |
| Market A: 200 @ 20.00 | Order 4: 600 @ 20.04 |
| Order 3: 300 @ 19.99 | |

The public order book looks like this:

| Bids | Offers |
| --- | --- |
| Posting Market Center 300 @ 19.99 | Posting Market Center 600 @ 20.04 |

Example 3: Tracking Liquidity Buy Order is Repriced at its Limit when the NBB Changes In this example, Away Market Center A changes its quote to $20.03 to $20.04 (500×300). When the posting market center 20 has Tracking Liquidity Buy Orders resting on the internal book and detects a new NBB, it checks to see if it should reprice any of the orders.

Referring to FIG. 8, at step 302, the process retrieves the Tracking Liquidity Buy Order with the highest current executable price (i.e. the highest CurrentBuyPrice). In this example, it retrieves Buy Order 5, the only Tracking Liquidity Order in the internal book. The process then compares the new NBB ($20.03) to the CurrentBuyPrice of the Tracking Liquidity Order ($20.00), at step 304.

In this example, since the NBB price is not less than the CurrentBuyPrice of Tracking Liquidity Buy Order 5, the process continues to step 306 to determine if the NBB is greater than the CurrentBuyPrice instead. In this example, the NBB ($20.03) is greater than the CurrentBuyPrice ($20.00), so Buy Order 5 can potentially be priced more aggressively, up to the lesser of the NBB and its "MaxPrice." At step 310, the process compares the NBB ($20.03) to Tracking Liquidity Buy Order 5's MaxPrice ($20.02), and determines that the NBB is higher. At step 313, the process checks if Tracking Liquidity Buy Order 5 is already priced as high as it can be, i.e., if its CurrentBuyPrice ($20.00) and its MaxPrice ($20.02) are equal. As they are not, the process, in turn, sets the CurrentBuyPrice of Tracking Liquidity Buy Order 5 to $20.02, its MaxPrice, as indicated at step 314. At step 316, the process inserts Tracking Liquidity Buy Order 5 in the Tracking Process level of the internal book according to the price/time priority of its new CurrentBuyPrice, $20.02. Away Market A's bid at $20.03 is superior to the price of Buy Order 5. At step 318, the process checks whether there are any additional Tracking Liquidity Buy Orders that may need to be repriced, and finding none, processing is complete, as indicated at 320.

The internal book now looks like this:

| Bids | Offers |
| --- | --- |
| MarketA: 500 @ 20.03 ← | Order 4: 600 @ 20.04 |
| Order 5: 400 @ 20.02, MaxPrice = 20.02 Tracking Process ← | MarketA: 300 @ 20.04 ← |
| Order 3: 300 @ 19.99 | |

The public order book remains unchanged and looks like this:

| Bids | Offers |
| --- | --- |
| Posting Market Center 300 @ 19.99 | Posting Market Center 600 @ 20.04 |

As Tracking Liquidity Buy Order 5 is no longer at the NBB, if a marketable incoming sell order were to be received at this time, it would not be eligible to intercept it, as that would result in a trade-through violation. For example, if the process received an order to Sell 300@20.02 at step 120, it would retrieve Tracking Liquidity Buy Order 5 at step 122, determine that the prices are equal at step 124, retrieve the NBB ($20.03) at step 126, and determine that Tracking Liquidity Buy Order 5 ($20.02) is inferior to the NBB at step 128. The process would then continue to step 134, where it routes the incoming Sell order to Away Market A and then stops at step 142.

Example 4: Tracking Liquidity Buy Order is Repriced at the NBB when the NBB Changes In this example, Away Market Center A changes its quote to $20.01 to $20.03 (200×400). Referring again to FIG. 8, at step 302, the process retrieves the Tracking Liquidity Buy Order with the highest current executable price (i.e. the highest CurrentBuyPrice). In this example, it retrieves Buy Order 5 again, the only Tracking Liquidity Order in the internal book. The process then compares the new NBB ($20.01) to the CurrentBuyPrice of the Tracking Liquidity Order ($20.02), at step 304.

As the NBB price is lower than the CurrentBuyPrice, Buy Order 5 must be repriced less aggressively. The process sets the CurrentBuyPrice of Tracking Liquidity Buy Order 5 to $20.01, the new NBB, as indicated at step 312. At step 316, the process inserts Tracking Liquidity Buy Order 5 in the Tracking Process level of the internal book according to the price/time priority of its new CurrentBuyPrice, $20.01. Buy Order 5 has priority over Away Market A's bid at $20.01, as the prices are equal but trading interest resident on the posting market center 20 has priority over away market interest at the same price. At step 318, the process checks whether there are any additional Tracking Liquidity Buy Orders that may need to be repriced, and finding none, processing is complete, as indicated at 320.

The internal book now looks like this:

| Bids | Offers |
|---|---|
| Order 5: 400 @ 20.01, MaxPrice = 20.02 Tracking Process ← | MarketA: 400 @ 20.03 ← |
| MarketA: 200 @ 20.01 ← | Order 4: 600 @ 20.04 |
| Order 3: 300 @ 19.99 | |

The public order book remains unchanged and still looks like this:

| Bids | Offers |
|---|---|
| Posting Market Center 300 @ 19.99 | Posting Market Center 600 @ 20.04 |

Example 5: Tracking Liquidity Buy Order Intercepts Incoming Sell

The posting market center 20 receives the following order:

Order 7: Sell 300@Market

Referring to FIG. 4, at step 122, the process retrieves its best (highest-priced) buy order, which is Tracking Liquidity Buy Order 5 in this example. The process compares the price of the incoming Sell Order (Market) to the retrieved Buy Order's price at step 124. As Buy Order 5 is a Tracking Liquidity Order, its price is currently set at $20.01, its CurrentBuyPrice. As a Market Order is always marketable by definition, the process retrieves the NBB ($20.01) at step 126. At step 128, it checks whether retrieved Buy Order 5's price ($20.01) is at the NBB ($20.01) so that trade through rules will be respected. As Buy Order 5 is at the NBB, the process continues to step 130, where it checks to see if Buy Order 5 is a Tracking Liquidity Order. The process determines that Buy Order 5 is a Tracking Liquidity Order. At step 132, the process determines that incoming Sell Order 7, as an unconditioned Market Order, is eligible to route, and is therefore eligible to match Buy Order 5 according to the rules for the order types. However, it can match Tracking Liquidity Buy Order 5 only if it complies with the 'size prevents routing' rule-namely that the number of remaining shares of the incoming order needs to be less than or equal to the number of shares available to trade in the Tracking Liquidity Order to prevent routing. The process invokes the routine to determine if the incoming order can be fully intercepted, as indicated at step 136.

Referring to FIG. 6, the process continues on to compare the Leaves quantity of incoming Sell Order 7 (300 shares—the full order size) to the size of Tracking Liquidity Buy Order 5 (400 shares) at step 152. As the incoming order size is less than the Tracking Liquidity Order size, a match is permissible as indicated.

At step 154, the process matches the 300 shares of incoming sell Order 7 with Tracking Liquidity Buy Order 5 at the price of $20.01, the NBB price. The process then checks to see if Tracking Liquidity Buy Order 5 still has unexecuted shares at step 156. As Tracking Liquidity Buy Order 5 has 100 shares remaining, the process cancels these remaining 100 shares, as indicated at 158, and removes the order from the internal book. The process completes at step 170 as shown. The internal book now looks like this:

| Bids | Offers |
|---|---|
| MarketA: 200 @ 20.01 | MarketA: 400 @ 20.03 |
| Order 3: 300 @ 19.99 | Order 4: 600 @ 20.04 |

The public order book remains unchanged and still looks like this:

| Bids | Offers |
|---|---|
| Posting Market Center 300 @ 19.99 | Posting Market Center 600 @ 20.04 |

Example 6: Incoming Tracking Liquidity Sell Order is Received

The posting market center 20 receives the following order:

Order 8: Sell 400@19.99, Tracking Liquidity

The NBBO is $20.01 to $20.03 (200×400). Although in this example, incoming Tracking Liquidity Sell Order 8 includes a specified limit price ($19.99) that crosses the current NBB (Market A's bid at $20.01) and locks the posting market center's own order book (posted Buy Order 3 at $19.99), the specified limit price is irrelevant since the order cannot currently execute at its specified "MinPrice." The MinPrice only defines the floor that caps how low the order will follow the NBO. Referring to FIG. 3, the process stores the specified limit price of $19.99 as the MinPrice of Tracking Liquidity Sell Order 8 at step 202. At step 204, it retrieves the NBO ($20.03) for the purpose of determining the relationship between the MinPrice and the NBO. At step 206, the process compares the MinPrice ($19.99) to the NBO ($20.03), and determines that the MinPrice is lower. In this example, as the MinPrice is lower than the NBO, the process, therefore, sets the current executable price (i.e., CurrentSellPrice) to $20.03, the NBO price, as indicated at 210. The process then inserts Tracking Liquidity Sell Order 8 in the Tracking Process level of the internal book at step 212 in price/time priority at its CurrentSellPrice, $20.03, and processing is completed at step 214. As Tracking Liquidity Sell Order 8 can only presently execute at $20.03, the NBO, no trade through would result if it executed at this price.

The internal book looks like this:

| Bids | Offers |
|---|---|
| MarketA: 200 @ 20.01 | Order 8: 400 @ 20.03, MinPrice = 19.99 Tracking Process ← |

-continued

| Bids | Offers |
|---|---|
| Order 3: 300 @ 19.99 | MarketA: 400 @ 20.03 |
| | Order 4: 600 @ 20.04 |

The public order book remains unchanged and still looks like this:

| Bids | Offers |
|---|---|
| Posting Market Center 300 @ 19.99 | Posting Market Center 600 @ 20.04 |

Example 7: Tracking Liquidity Sell Order is Repriced at NBO when NBO Changes In this example, Away Market A changes its offer to 900 at $20.02. Referring to FIG. 9, at step 352, the process retrieves the Tracking Liquidity Sell Order with the lowest current executable price (i.e. the CurrentSellPrice). In this example, it retrieves Sell Order 8, the only Tracking Liquidity Order in the internal book. The process then compares the new NBO ($20.02) to the CurrentSellPrice of the Tracking Liquidity Order ($20.03), at step 354.

In this example, since the NBO price is not greater than the CurrentSellPrice of Tracking Liquidity Sell Order 8, the process continues to step 356 to determine if the NBO is less than the CurrentSellPrice instead. In this example, the NBO ($20.02) is less than the CurrentSellPrice ($20.03), so Sell Order 8 can potentially be priced more aggressively, down to the greater of the NBO and its "MinPrice." At step 360, the process compares the NBO ($20.02) to Tracking Liquidity Sell Order 8's MinPrice ($19.99), and determines that the NBO is higher. The process, in turn, sets the CurrentSellPrice of Tracking Liquidity Sell Order 8 to $20.02, the new NBO price, as indicated at step 362. At step 366, the process inserts Tracking Liquidity Sell Order 8 in the Tracking Process level of the internal book according to the price/time priority of its new CurrentSellPrice, $20.02. At step 368, the process checks whether there are any additional Tracking Liquidity Sell Orders that may need to be repriced, and finding none, processing is complete, as indicated at 370.

The internal book now looks like this:

| Bids | Offers |
|---|---|
| MarketA: 200 @ 20.01 | Order 8: 400 @ 20.02, MinPrice = 19.99 Tracking Process ← |
| Order 3: 300 @ 19.99 | MarketA: 900 @ 20.02 ← |
| | Order 4: 600 @ 20.04 |

The public order book remains unchanged and still looks like this:

| Bids | Offers |
|---|---|
| Posting Market Center 300 @ 19.99 | Posting Market Center 600 @ 20.04 |

Example 8: Incoming Tracking Liquidity Sell Order with Better Price is Received The posting market center 20 receives the following order:

Order 9: Sell 600@19.98, Tracking Liquidity

Referring to FIG. 3, the process evaluates Sell Order 9 in much the same manner as it did Sell Order 8. Upon receiving Tracking Liquidity Sell Order 9 at step 200, the process stores the specified limit price ($19.98) as the order's MinPrice at step 202, retrieves the NBO ($20.02) at step 204, and compares the MinPrice to the NBO at step 206. As the MinPrice is lower than the NBO, the process sets the current executable price (i.e., CurrentSellPrice) to $20.02, the NBO price, as indicated at 210. The process then inserts Tracking Liquidity Sell Order 9 in the Liquidity Process level of its internal book at step 212. As both Tracking Liquidity Order 8 and Tracking Liquidity Order 9 have the same CurrentSellPrice ($20.02, the NBO), Tracking liquidity Order 8 has higher priority in the internal book because it has time priority at the CurrentSellPrice of $20.02, even though Tracking Liquidity Order 9 has a superior (lower) MinPrice. This illustrates that Tracking Liquidity Sell Orders are ranked according to their current executable price, and not according to their minimum pegging price.

The internal book looks like this:

| Bids | Offers |
|---|---|
| MarketA: 200 @ 20.01 | Order 8: 400 @ 20.02, MinPrice = 19.99 Tracking Process |
| Order 3: 300 @ 19.99 | Order 9: 600 @ 20.02, MinPrice = 19.98 Tracking Process ← |
| | MarketA: 900 @ 20.02 |
| | Order 4: 600 @ 20.04 |

The public order book is unchanged and still looks like this:

| Bids | Offers |
|---|---|
| Posting Market Center 300 @ 19.99 | Posting Market Center 600 @ 20.04 |

Example 9: Lower Priority Tracking Liquidity Sell Order Trades with Incoming Buy Order The posting market center 20 receives the following order:

Order 10: Buy 500@20.03

Referring to FIG. 5, the process retrieves its best sell order, which is Tracking Liquidity Order 8 in this example. The process then compares the price of incoming Buy Order 10 ($20.03) to the price of retrieved Sell Order 8 (whose CurrentSellPrice=$20.02) at step 224. The prices overlap, so the process retrieves the NBO ($20.02) at step 226, and compares it to the price of retrieved Sell Order 8 ($20.02) at step 228. As the prices are equal since Sell Order 8 is at the NBO, the process checks to see if Sell Order 8 is a Tracking Liquidity Order at step 230. In this example, the process determines that Sell Order 8 is a Tracking Liquidity Order. At step 232, the process determines that incoming Buy Order 10 is a regular limit-priced order, an order type that is eligible for routing. As such, Buy Order 10 is potentially eligible to match with Tracking Liquidity Sell Order 8 subject to the 'size prevents routing' rule, as indicated at step 236. The process invokes the routine to determine if the incoming Buy Order can be fully intercepted.

In this regard, referring to FIG. 7, the process compares the Leaves quantity of incoming Buy Order 10 (500 shares—the full order size) to the size of Tracking Liquidity sell Order 8 (400 shares) at step 252. In this example, since the size of the incoming Buy Order exceeds the size of the Tracking Liquidity Sell Order, the process cannot match these orders.

The process, therefore, proceeds to step 259, where it checks whether any additional Tracking Liquidity Sell Orders are present in the internal book. Sell Order 9 is also a Tracking Liquidity Order, so the process retrieves its next best Tracking Liquidity Sell Order, which is Tracking Liquidity Order 9, as indicated at step 260. The process determines that Sell Order 9 is also at the NBO by comparing its CurrentSellPrice ($20.02) to the NBO ($20.02) at step 262. As Tracking Liquidity Sell Order 9 is at the NBO and therefore eligible for execution in this example, the process once again applies the 'size prevents routing' rule to determine, as before, if the incoming Buy Order can be fully intercepted, by returning to step 252.

Referring again to step 252, the process compares the size of incoming Buy Order 10 (500 shares) to the size of retrieved Tracking Liquidity Sell Order 9 (600 shares) at step 252. Since the size of the incoming Buy Order is less than the size of this Tracking Liquidity Sell Order, a match is permissible. The process, therefore, matches incoming Buy Order 10 with Tracking Liquidity Sell Order 9 at the NBO price of $20.02, as indicated at step 254. The process then checks to see if Tracking Liquidity Sell Order 9 still has any unexecuted shares at step 256. Order 9 has 100 shares remaining in this example, so the process cancels the remaining 100 shares, as indicated at 258. Tracking Liquidity Sell Order 9 is removed from the internal book. Tracking Liquidity Sell Order 8 remains in the internal book and is available for matching.

The internal book looks like this:

| Bids | Offers |
|---|---|
| MarketA: 200 @ 20.01 | Order 8: 400 @ 20.02, MinPrice = 19.99 Tracking Process |
| Order 3: 300 @ 19.99 | MarketA: 900 @ 20.02 |
| | Order 4: 600 @ 20.04 |

The public order book remains unchanged and still looks like this:

| Bids | Offers |
|---|---|
| Posting Market Center 300 @ 19.99 | Posting Market Center 600 @ 20.04 |

Example 10: Tracking Liquidity Buy Order is Received and Ranked on an Options Posting Market Center The examples that follow immediately illustrate one implementation of how Tracking Liquidity Orders trade on an options marketplace. In these examples, the posting market center has appointed Market Makers in some issues. When an appointed Market Maker is the Lead Market Maker in the issue, then that Market Maker is guaranteed participation with incoming orders in accordance with the business rules of the posting market center. By way of example, some of those business rules are implemented in the Order Execution Process referred to as the Lead Market Maker Guarantee Process in this document.

It should be understood that the Market Maker Guarantee Process described below is subject to change and serves only to illustrate the matching priority of Market Maker quotes in relation to resting Tracking Liquidity Orders stored on the posting market center, and that a broader discussion of Market Maker rules, responsibilities, and entitlements is beyond the scope of this document. For the purposes of this example, the issue has a Lead Market Maker ("LMM"), and if the Lead Market Maker is quoting at the NBBO at the time an incoming marketable order is received, the Lead Market Maker is guaranteed participation with the incoming order. In this example, participation is guaranteed for up to 40% of the remaining quantity of the incoming order, after customer orders with price/time priority ahead of the Lead Market Maker's quote have been satisfied first. As the business rules for the Lead Market Maker Guarantee Process may be implemented differently, it should be noted that the purpose of these examples is not to illustrate Market Maker Guarantees, it is to illustrate the ranking of Market Maker quotes compared to Tracking Liquidity Orders within the order matching engine 21. The invention is in no way limited to the embodiments used below for illustration purposes. It should also be noted that in the examples that follow, Away Market Center A's quote is shown in the same table ("combined Quote Book") as Lead Market Maker LMM's quote 33 for illustration purposes, although away market quotes may actually be stored in a different table 25.

At the start of this example, the NBBO is $2.00 to $2.10 (50×80). The combined Quote Book looks like this:

| Bids | Offers |
|---|---|
| MarketA: 50 @ 2.00 | LMM: 30 @ 2.10 |
| LMM: 40 @ 1.95 | MarketA: 50 @ 2.10 |

The internal order book looks like this:

| Bids | Offers |
|---|---|
| Order 20: 10 @ 1.95 | Order 21: 20 @ 2.15 |

The public order book, which disseminates the aggregated Market Maker quotes and displayed orders, looks like this:

| Bids | Offers |
|---|---|
| Posting Market Center 50 @ 1.95 | Posting Market Center 30 @ 2.10 |
| | Posting Market Center 20 @ 2.15 |

The posting market center 20 receives the following order:

Order 22: Buy 20@2.10, Tracking Liquidity

The process is activated and, referring to FIG. 2, at step 102, the process stores the specified limit price on incoming Tracking Liquidity Buy Order 22 ($2.10) as the value of its "MaxPrice," the highest price to which Buy Order 22 will follow the NBB. The process continues to step 104, where it retrieves the NBB ($2.00). The process compares the MaxPrice of Buy Order 22 ($2.10) to the NBB ($2.00) at step 106. In this case, the MaxPrice is higher than the NBB, so the process sets the current executable price of the Tracking Liquidity Buy Order (i.e. the "CurrentBuyPrice" parameter) to the NBB price ($2.00) at step 110. The process inserts Tracking Liquidity Buy Order 22 into the Tracking Process sublevel of the internal order book at step 112, where it is ranked according to the price/time priority of its CurrentBuyPrice ($2.00). At the price of $2.00, Tracking Liquidity Buy Order 22 is presently ranked first among the orders and quotes, as it alone can execute at the price of $2.00 on the posting market center 20. The process is completed at step 114 as indicated.

The combined Quote Book remains unchanged and still looks like this:

| Bids | Offers |
|---|---|
| MarketA: 50 @ 2.00 | LMM: 30 @ 2.10 |
| LMM: 40 @ 1.95 | MarketA: 50 @ 2.10 |

The internal order book now looks like this:

| Bids | Offers |
|---|---|
| Order 22: 20 @ 2.00, MaxPrice = 2.10. Tracking Process ← Order 20: 10 @ 1.95 | Order 21: 20 @ 2.15 |

The public order book remains unchanged and still looks like this:

| Bids | Offers |
|---|---|
| Posting Market Center 50 @ 1.95 | Posting Market Center 30 @ 2.10 |
| | Posting Market Center 20 @ 2.15 |

Example 11: Tracking Liquidity Buy Order Cannot Intercept Incoming Sell Order

The posting market center 20 receives the following order:

Order 23: Sell 30@2.00

When a marketable incoming order is received in an issue that has an assigned Lead Market Maker, the order matching engine 21 attempts to execute the order in the Lead Market Maker Guarantee Process if possible. However, the Lead Market Maker is not entitled to guaranteed participation unless the Market Maker's quote is at the NBBO at the time the incoming order is received. In this example, the LMM bid (40@$1.95) is inferior to the NBB ($2.00), so incoming Sell Order 23 cannot execute in the Lead Market Maker Guarantee Process, and the order matching engine 21 processes the order as if the issue did not have a Lead Market Maker.

At step 122 in FIG. 4, the process retrieves the highest-priced resting buy order. As there are no orders in the Display Process or the Working Process that can execute at $2.00, it retrieves Tracking Liquidity Buy Order 22 in this example. The process compares the price of incoming Sell Order 23 ($2.00) with retrieved Buy Order 22 at step 124. As Buy Order 22 is a Tracking Liquidity Order, its price is set at the value of its CurrentBuyPrice ($2.00). The process compares the prices and determines that they are equal. As the prices are equal, the process retrieves the NBB ($2.00) at step 126, and compares the price of retrieved Buy Order 22 ($2.00) to the NBB. As the prices are equal and the orders are eligible to match, the process checks to see if retrieved Buy Order 22 is a Tracking Liquidity Order at step 130. In this example, Buy Order 22 is a Tracking Liquidity Order, which means that it can only execute with order types that are eligible to be routed off the posting market center 20. At step 132, the process determines that incoming Sell Order 23, as a regular limit-priced order, is eligible to route, and is therefore eligible to match Buy Order 22 according to the rules for the order types. However, it can match Tracking Liquidity Buy Order 22 only if it complies with the 'size prevents routing' rule-namely that the number of remaining contracts of the incoming order needs to be less than or equal to the number of contracts available to trade in the Tracking Liquidity Order to prevent routing. The process invokes the routine to determine if the incoming order can be fully intercepted, as indicated at step 136.

Referring to FIG. 6, the process compares the size of Tracking Liquidity Buy Order 22 (20 contracts) to the Leaves quantity of incoming Sell Order 23 (30 contracts—the full order size) at step 152. As the Leaves quantity of incoming Sell Order 23 exceeds the size of Tracking Liquidity Buy Order 22 in this example, Order 22 is not large enough to prevent Order 23 from routing. As a result, the process determines that Tracking Liquidity Buy Order 22 cannot trade, and the process bypasses Tracking Liquidity Buy Order 22 and continues to step 159, where it checks to see if there are any additional Tracking Liquidity Buy Orders that could possibly interact with incoming Sell Order 23 instead. As none exist, the process looks for away market bids whose prices overlap with incoming Sell Order 23, as indicated at step 164, and finds Market A's bid at $2.00. As such, the process routes all 30 contracts of incoming Sell Order 23 to Market A. Market A fills the 30 contracts and decreases its bid size. At step 166, the process determines that incoming Sell Order 23 has no remaining contracts available, and processing is complete, as indicated at step 170.

The combined Quote Book looks like this:

| Bids | Offers |
|---|---|
| MarketA: 20 @ 2.00 ← | LMM: 30 @ 2.10 |
| LMM: 40 @ 1.95 | MarketA: 50 @ 2.10 |

The internal order book remains unchanged and still looks like this:

| Bids | Offers |
|---|---|
| Order 22: 20 @ 2.00, MaxPrice = 2.10. Tracking Process Order 20: 10 @ 1.95 | Order 21: 20 @ 2.15 |

The public order book remains unchanged and still looks like this:

| Bids | Offers |
|---|---|
| Posting Market Center 50 @ 1.95 | Posting Market Center 30 @ 2.10 |
| | Posting Market Center 20 @ 2.15 |

Example 12: Tracking Liquidity Order Intercepts Incoming Order After it Trades with Market Maker Quote Lead Market Maker LMM updates its bid to 40@2.00. The NBBO is now $2.00 to $2.10 (60×80).

The combined Quote Book now looks like this:

| Bids | Offers |
|---|---|
| LMM: 40 @ 2.00 ← | LMM: 30 @ 2.10 |
| MarketA: 20 @ 2.00 | MarketA: 50 @ 2.10 |

The internal order book remains unchanged and still looks like this:

| Bids | Offers |
|---|---|
| Order 22: 20 @ 2.00, MaxPrice = 2.10. Tracking Process Order 20: 10 @ 1.95 | Order 21: 20 @ 2.15 |

The public order book now looks like this:

| Bids | Offers |
|---|---|
| Posting Market Center 40 @ 2.00 ← | Posting Market Center 30 @ 2.10 |
| Posting Market Center 10 @ 1.95 ← | Posting Market Center 20 @ 2.15 |

The posting market center 20 receives the following order:

Order 24: Sell 60@2.00

Although in the previous example, Lead Market Maker LMM was not entitled to guaranteed participation because its bid was not at the NBB at the time the incoming order was received, the situation is different now. In this example, the LMM bid (40@$2.00) is equal to the NBB ($2.00), so incoming Sell Order 24 can execute in the Lead Market Maker Guarantee Process. In this example, the Lead Market Maker is guaranteed execution of up to 40% of the Leaves quantity of an incoming order, after that order has first satisfied any displayed Customer orders with price/time priority. As Tracking Liquidity Buy Order 22 has time priority but is not a displayed Customer order, and Buy Order 20 is displayed but has an inferior price ($1.95), no orders have priority over the LMM bid. As such, the LMM bid is entitled to trade fully with incoming Sell Order 24 in this example. The order matching engine 21 executes 40 contracts of incoming Sell Order 24 against a buy order automatically generated on behalf of the LMM bid at $2.00 in the Lead Market Maker Guarantee Process. (Alternatively, in a different implementation, the 40 contracts may be executed in two steps: 24 contracts may execute in the Lead Market Maker Guarantee Process according to the 40% guarantee (40% of 60=24), and the remaining 16 contracts may execute in the Display Process according to normal price/time priority.) At the conclusion of the process, the order matching engine 21 determines that incoming Sell Order 24 still has 20 contracts available to trade.

At step 122 in FIG. 4, the process retrieves the highest-priced resting buy order. As there are no additional Market Maker bids at $2.00 and there are no orders in the Display Process or the Working Process that can execute at $2.00, it retrieves Tracking Liquidity Buy Order 22 in this example. The process compares the price of incoming Sell Order 24 ($2.00) with retrieved Buy Order 22 at step 124. As Buy Order 22 is a Tracking Liquidity Order, its price is set at the value of its CurrentBuyPrice ($2.00). The process compares the prices and determines that they are equal. As the prices are equal, the process retrieves the NBB (still $2.00) at step 126, and compares the price of retrieved Buy Order 22 ($2.00) to the NBB. As the prices are equal and the orders are eligible to match, the process checks to see if retrieved Buy Order 22 is a Tracking Liquidity Order at step 130. In this example, Buy Order 22 is a Tracking Liquidity Order, which means that it can only execute with order types that are eligible to be routed off the posting market center 20. At step 132, the process determines that incoming Sell Order 24, as a regular limit-priced order, is eligible to route, and is therefore eligible to match Buy Order 22 according to the rules for the order types. However, it can match Tracking Liquidity Buy Order 22 only if it complies with the 'size prevents routing' rule-namely that the number of remaining contracts of the incoming order needs to be less than or equal to the number of contracts available to trade in the Tracking Liquidity Order to prevent routing. The process invokes the routine to determine if the incoming order can be fully intercepted, as indicated at step 136.

Referring to FIG. 6, the process compares the size of Tracking Liquidity Buy Order 22 (20 contracts) to the Leaves quantity of incoming Sell Order 24 (20 contracts) at step 152. As the sizes are equal in this example, the process determines that the orders can trade. At step 154, the process matches the remaining 20 contracts of incoming Sell Order 24 with Tracking Liquidity Buy Order 22 at the NBB price of $2.00. At step 156, the process checks whether Tracking Liquidity Buy Order 22 has any quantity remaining to trade, and determining that it does not, it proceeds to step 170 where the process stops.

The combined Quote Book looks like this after LMM moves its bid:

| Bids | Offers |
|---|---|
| MarketA: 20 @ 2.00 | LMM: 30 @ 2.10 |
| LMM: 40 @ 1.95 ← | MarketA: 50 @ 2.10 |

The internal order book looks like this after Order 22 is removed:

| Bids | Offers |
|---|---|
| Order 20: 10 @ 1.95 | Order 21: 20 @ 2.15 |

The public order book looks like this:

| Bids | Offers |
|---|---|
| Posting Market Center 50 @ 1.95 | Posting Market Center 30 @ 2.10 |
| | Posting Market Center 20 @ 2.15 |

While the invention has been discussed in terms of certain embodiments, it should be appreciated that the invention is not so limited. The embodiments are explained herein by way of example, and there are numerous modifications, variations and other embodiments that may be employed that would still be within the scope of the present invention.

The invention claimed is:

1. A system comprising:
    a posting market center computer coupled to a plurality of external data sources via a network, the posting market center computer having a computer-readable storage medium and at least one processor for executing program code stored in the computer-readable storage medium, the program code defining at least one order matching engine and an order book, the posting market center computer configured to:

receive, via an interface of the posting market center computer, from among the plurality of external data sources, displayed orders and nondisplayed orders, at least one of the nondisplayed orders including a tracking liquidity order, position, via the at least one order matching engine, the displayed orders and the nondisplayed orders among one or more processing levels of the order book according to one or more predetermined order type rules, receive, via the interface, from among the plurality of external data sources, an incoming order that is eligible for routing to an away market among the plurality of external data sources, determine, via the at least one order matching engine, to prevent the incoming order that is eligible for routing to the away market from being routed to the away market, and execute, via the at least one order matching engine, the incoming order against the tracking liquidity order in accordance with a matching priority with respect to the displayed orders positioned in the order book, without routing the incoming order to the away market, the matching priority based in part on pricing characteristics of the tracking liquidity order.

2. The system of claim 1, wherein no price and no size component of the tracking liquidity order is displayed in the order book.

3. The system of claim 1, wherein no part of the tracking liquidity order is displayed to a marketplace computer.

4. The system of claim 1, wherein the displayed orders include one or more of fully displayed orders and partially displayed orders.

5. The system of claim 1, wherein the system is further configured to receive market maker quotes and position the market maker quotes among the one or more processing levels of the order book.

6. The system of claim 1, wherein the at least one order matching engine is configured to position the displayed orders and the nondisplayed orders in the order book according to a ranking index and a price index.

7. The system of claim 6, wherein the ranking index is based on an extent of disclosure of the displayed orders and the nondisplayed orders.

8. The system of claim 6, wherein the tracking liquidity order is positioned in the order book according to a tracking liquidity order ranking and a nondisplayed price of the tracking liquidity order.

9. The system of claim 6, wherein the at least one order matching engine is configured to determine to prevent the incoming order from being routed to the away market by:
i) interrogating the price index of the order book corresponding to a price of the incoming order to identify a contra side order in the order book;
(ii) interrogating the ranking index of the order book to determine whether the contra side order is the tracking liquidity order; and
(iii) determining that a remaining size of the incoming order is not greater in size than a size component of the tracking liquidity order.

10. The system of claim 9, wherein the posting market center computer is further configured to determine that the contra side order is at a national best bid or offer.

11. The system of claim 1, further comprising a publishing interface configured to publish market maker quotes and generate an order on behalf of a market maker quote when the market maker quote is deemed marketable.

12. The system of claim 1, wherein when the tracking liquidity order has a price superior to the displayed orders, the at least one order matching engine is configured to execute the incoming order against the tracking liquidity order prior to the displayed orders.

13. The system of claim 12, wherein:
the order book is further configured to store market maker quotes, and
the at least one order matching engine is configured to execute the incoming order against the tracking liquidity order prior to the displayed orders and the market maker quotes, when said price of the tracking liquidity order is superior to the displayed orders and the market maker quotes.

14. The system of claim 1, wherein when the tracking liquidity order has a price equal to the displayed orders, the at least one order matching engine is configured to execute the incoming order against the tracking liquidity order subsequent to the displayed orders.

15. The system of claim 14, wherein:
the order book is further configured to store market maker quotes, and
the at least one order matching engine is configured to execute the incoming order against the tracking liquidity order subsequent to the displayed orders and the market maker quotes, when said price of the tracking liquidity order has a price equal to the displayed orders and the market maker quotes.

16. The system of claim 1, wherein the tracking liquidity order comprises a tracking liquidity buy order and the incoming order comprises a marketable sell order, wherein the tracking liquidity buy order has a fluctuating current price parameter, and wherein the fluctuating current price parameter of the tracking liquidity buy order is capped at a national best bid price to prevent a trade through violation.

17. The system of claim 16, wherein the posting market center computer is further configured to reset the fluctuating current price parameter of the tracking liquidity buy order when a national best bid price changes.

18. The system of claim 17, wherein the tracking liquidity order comprises a maximum price, and wherein the fluctuating current price parameter of the tracking liquidity buy order cannot exceed the maximum price, regardless of a national best bid.

19. The system of claim 1, wherein the tracking liquidity order comprises a tracking liquidity sell order and the incoming order comprises a marketable buy order, wherein the tracking liquidity sell order has a fluctuating current price parameter, and wherein the fluctuating current price parameter of the tracking liquidity sell order is capped at a national best offer price to prevent a trade through violation.

20. The system of claim 19, wherein the posting market center computer is further configured to reset the fluctuating current price parameter of the tracking liquidity sell order when a national best offer price changes.

21. The system of claim 20, wherein the tracking liquidity sell order further has a minimum price, and wherein the fluctuating current price parameter of the tracking liquidity sell order cannot be lower than the minimum price, regardless of a national best offer.

22. The system of claim 1, wherein the posting market center computer is further configured to confirm that the incoming order is eligible for routing to the away market.

23. The system of claim 1, wherein the posting market center computer is further configured to route the incoming order to the away market when a contra side order that corresponds to a price of the incoming order is not identified in the order book.

\* \* \* \* \*